(12) United States Patent
Eng et al.

(10) Patent No.: US 10,263,648 B2
(45) Date of Patent: Apr. 16, 2019

(54) LOW COST MILLIMETER WAVE RECEIVER AND METHOD FOR OPERATING SAME

(71) Applicant: The Boeing Company, Chicago, IL (US)

(72) Inventors: John E. Eng, Buena Park, CA (US); Frank S. Yu, Los Angeles, CA (US)

(73) Assignee: THE BOEING COMPANY, Chicago, IL (US)

(*) Notice: Subject to any disclaimer, the term of this patent is extended or adjusted under 35 U.S.C. 154(b) by 7 days.

(21) Appl. No.: 15/457,754

(22) Filed: Mar. 13, 2017

(65) Prior Publication Data
US 2018/0262218 A1    Sep. 13, 2018

(51) Int. Cl.
| | |
|---|---|
| *H04B 1/00* | (2006.01) |
| *H04B 1/10* | (2006.01) |
| *H04B 1/40* | (2015.01) |
| *H04B 7/155* | (2006.01) |
| *H04B 7/185* | (2006.01) |
| *H04B 1/7097* | (2011.01) |

(52) U.S. Cl.
CPC .............. *H04B 1/0071* (2013.01); *H04B 1/00* (2013.01); *H04B 1/1036* (2013.01); *H04B 1/40* (2013.01); *H04B 1/7097* (2013.01); *H04B 7/155* (2013.01); *H04B 7/18515* (2013.01); *H04B 2001/1054* (2013.01); *H04B 2201/7097* (2013.01)

(58) Field of Classification Search
CPC .... H04B 7/2041; H04B 7/18515; H04B 3/23; H04B 3/32; H04L 25/0266; H04L 25/03343; H04L 7/033; H04L 27/2647; H04L 5/0007
See application file for complete search history.

(56) References Cited

U.S. PATENT DOCUMENTS

| | | | |
|---|---|---|---|
| 5,956,620 A * | 9/1999 | Lazaris-Brunner | .......................... H04B 7/18515 455/12.1 |
| 7,024,158 B2 * | 4/2006 | Wiswell | ................. H01Q 1/288 348/726 |
| 2003/0134635 A1 * | 7/2003 | Lane | ................... H04B 7/18515 455/428 |
| 2012/0094593 A1 * | 4/2012 | Burr | ................... H04B 7/18515 455/12.1 |

* cited by examiner

*Primary Examiner* — Sam K Ahn
*Assistant Examiner* — Amneet Singh
(74) *Attorney, Agent, or Firm* — Gates & Cooper LLP

(57) ABSTRACT

A low cost millimeter wave receiver and method for operating same is disclosed. In one embodiment, the method comprises receiving the first signal, converting the first signal of the first bandwidth into an intermediate frequency band, splitting the converted first signal into N of intermediate signals, each having a bandwidth less than the digital processor bandwidth, wherein N is an integer greater than one, downconverting each of the N intermediate signals to the second frequency band, processing the downconverted plurality of signals with the digital processor to generate N processed signals, upconverting each of the N processed signals to the intermediate frequency band, converting the upconverted signals to the third frequency band, and transmitting the converted signals.

29 Claims, 21 Drawing Sheets

US 10,263,648 B2

LOW COST MILLIMETER WAVE RECEIVER AND METHOD FOR OPERATING SAME

BACKGROUND

1. Field

The present disclosure relates to systems and methods for receiving and processing modulated digital signals, and in particular to a low cost system and method for economically processing such modulated digital signals.

2. Description of the Related Art

Satellite communication systems are well known. Such communications have traditionally been performed in L-band (1-2 GHz), S-band (2-4 GHz), C-band (4-8 GHz), X-band (8-12 GHz), Ku-band (12-18 GHz), K-band (18-26 GHz) and Ka-band (26-40 GHz).

Recently, the Federal Communications Commission (FCC) has allocated millimeter wave (MMW) frequency bands for such communications, including Q-band (33-50 Ghz), V-band (40-75 GHz) and W-band (75-110 GHz). Specifically, it is proposed to allocate a portion of the Q-band (specifically, 37-42 GHz) to transmissions from satellites, a portion of the V-band (specifically, 42.5-51.4 GHz) to transmissions to satellites, and another portion of the V-band (specifically 59-63 GHz) to crosslink transmissions from satellite to satellite. Further, communications within the E-band (spanning the W-band and V-band), have been proposed, specifically, 71-76 GHz for transmissions from satellites and 81-86 GHz for transmissions to satellites.

There is an ongoing need in the art for systems and methods that permit such frequency bands to be utilized at low cost and with minimum changes to existing satellite systems. Such a system and method is disclosed below.

SUMMARY

This document discloses a system and method for processing a first signal in a first frequency band having a first bandwidth by a digital processor in a second frequency band having a bandwidth capacity of a digital processor bandwidth less than the first bandwidth to generate a second signal in a third frequency band having the first bandwidth. In one embodiment, the method comprises receiving the first signal, converting the first signal of the first bandwidth into an intermediate frequency band, splitting the converted first signal into N intermediate signals, each having a bandwidth less than the digital processor bandwidth, wherein N is an integer greater than one, downconverting each of the N intermediate signals to the second frequency band, processing the downconverted plurality of signals with the digital processor to generate N processed signals, upconverting each of the N processed signals to an intermediate frequency band, converting the upconverted signals to the third frequency band, and transmitting the converted signals. Another embodiment is evidenced by means for performing the foregoing operations, as described below.

In another embodiment, an apparatus is disclosed which comprises a single receive unit for receiving the first signal, the single receive unit comprising a single converter, communicatively coupled to the receive unit, the converter for converting the first signal of the first bandwidth into an intermediate frequency band, a splitter, communicatively coupled to the converter, the splitter for splitting the converted first signal into N of intermediate signals, each having a bandwidth less than the digital processor bandwidth, wherein N is an integer greater than one, N downconverters, each of the N downconverters communicatively coupled to the splitter and each of the N downconverters for downconverting an associated one of the N intermediate signals to the second frequency band, a digital processing unit, for processing the downconverted plurality of signals with the digital processor to generate N processed signals, N upconverters, each of the N upconverters communicatively coupled to an associated one of the N processed signals to the second frequency band, a combiner, communicatively coupled to each of the N upconverters, for combining the upconverted N processed signals, an upconverter, communicatively coupled to the combiner, for converting the combined N upconverted signals to the third frequency band, and a transmitter, for transmitting the converted signals. Still another embodiment is evidenced by an apparatus having a processor and a communicatively coupled memory storing processor instructions for performing the foregoing operations.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

Figure 1:
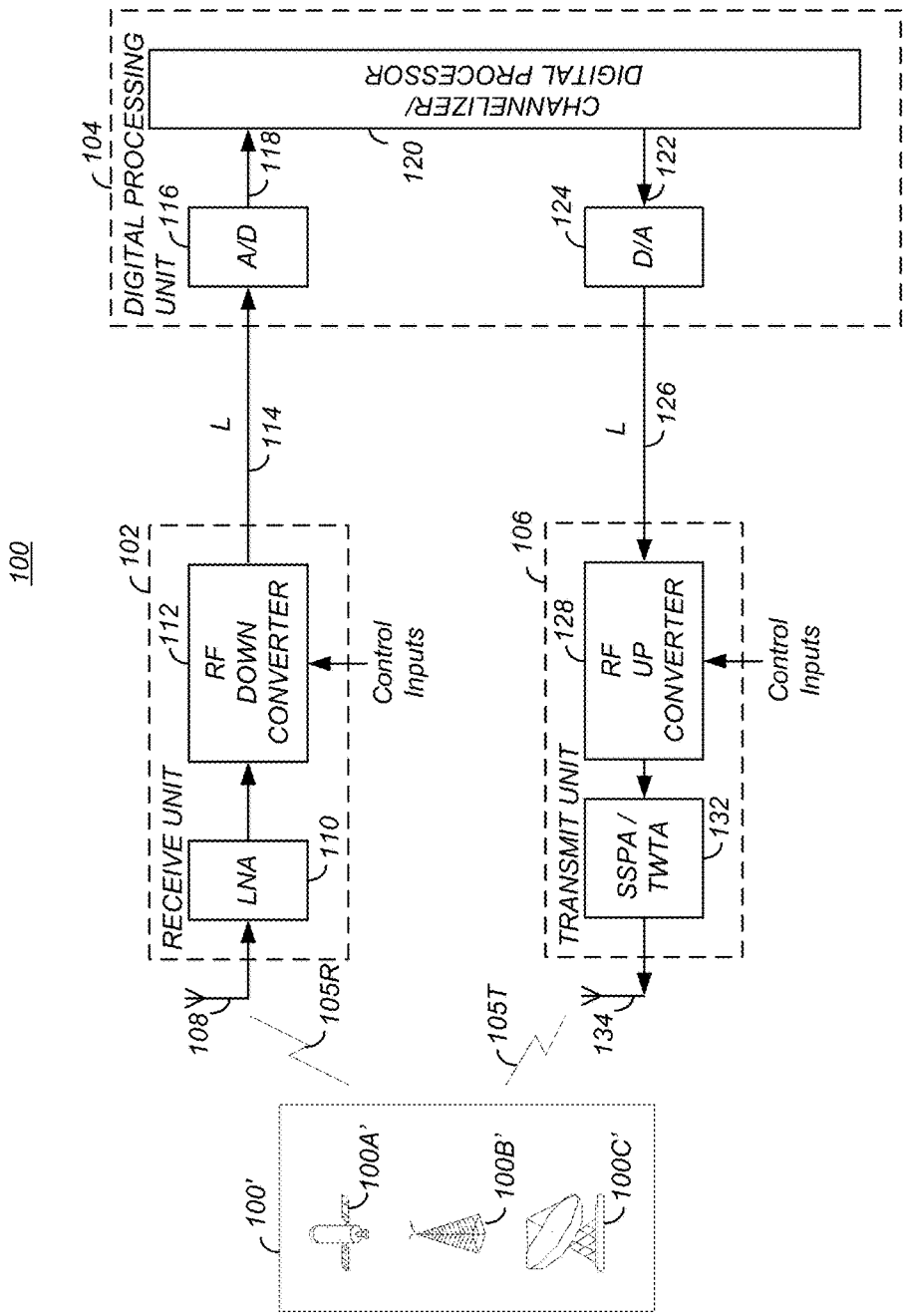
FIG. 1 is a diagram illustrating a transceiver that may be used in satellite applications.

FIG. 1 is a diagram illustrating a transceiver 100 that may be used in satellite applications. The transceiver 100 includes a receive unit 102 communicatively coupled to a digital processing unit (DPU) 104 which is also communicatively coupled to a transmit unit 106.

The receiver unit 102 is coupled to a receive antenna 108 for sensing a receive signal 105R from another transceiver 100' such as a satellite 100A', terrestrial transceiver 100B', or a ground station 100C'. The sensed signal is amplified by a low noise amplifier (LNA) 110, and provided to a radio frequency (RF) down converter 112. The RF downconverter 112 downconverts the amplified signal from the LNA 110 in frequency to a lower frequency (for example, L-band) signal 114. The downconverted signal 114 is digitally sampled and digitized by analog to digital (A/D) converter 116, and the resulting digitized signal 118 is provided to a channelizer/digital processor 120.

The digital channelizer 120 performs operations on the digitized downconverted signal to generate a digital processed signal 122 that is converted to an analog processed signal 126 by digital-to-analog (D/A) converter 124. The analog processed signal is upconverted to higher frequency by RF upconverter 128, amplified by amplifier 132 such as a traveling wave tube amplifier (TWTA) or solid state power amplifier (SSPA), and provided to the transmit antenna 134 to generate a transmit signal 105T to one or more of the other transceivers 100'.

According to the well known Nyquist criteria, A/D converter 116 must sample the downconverted signal at a rate at least twice the largest bandwidth of the downconverted signal itself to prevent aliasing. In practice, the sampling rate is even higher, to account for imperfect anti-aliasing filters which may induce phase distortion if the frequency cutoffs are too severe. Accordingly, the operations performed by the DPU 120 must performed at a rate at least twice the largest bandwidth of the downconverted signal 114. DPUs 120 capable of processing signals at these high rates have been produced. Such DPUs 120 are expensive to design and produce. For typical satellite applications, the first signal 105 is a 500 MHz L-band signal and the downconverted signal 114 is n L-band signal of 500 MHz bandwidth. Accordingly, DPUs 120 capable of processing signals of this bandwidth have been developed and are readily available.

As described above, other frequency bands have become available for such communications, including Q-band (33-50 Ghz), V-band (40-75 GHz) and W-band (75-110 GHz). To use such wide bandwidths without incurring the expense of developing new DPUs capable of handling such bandwidths, the bandwidth must be reduced to smaller (e.g. 500 MHz) chunks.

Figure 2:
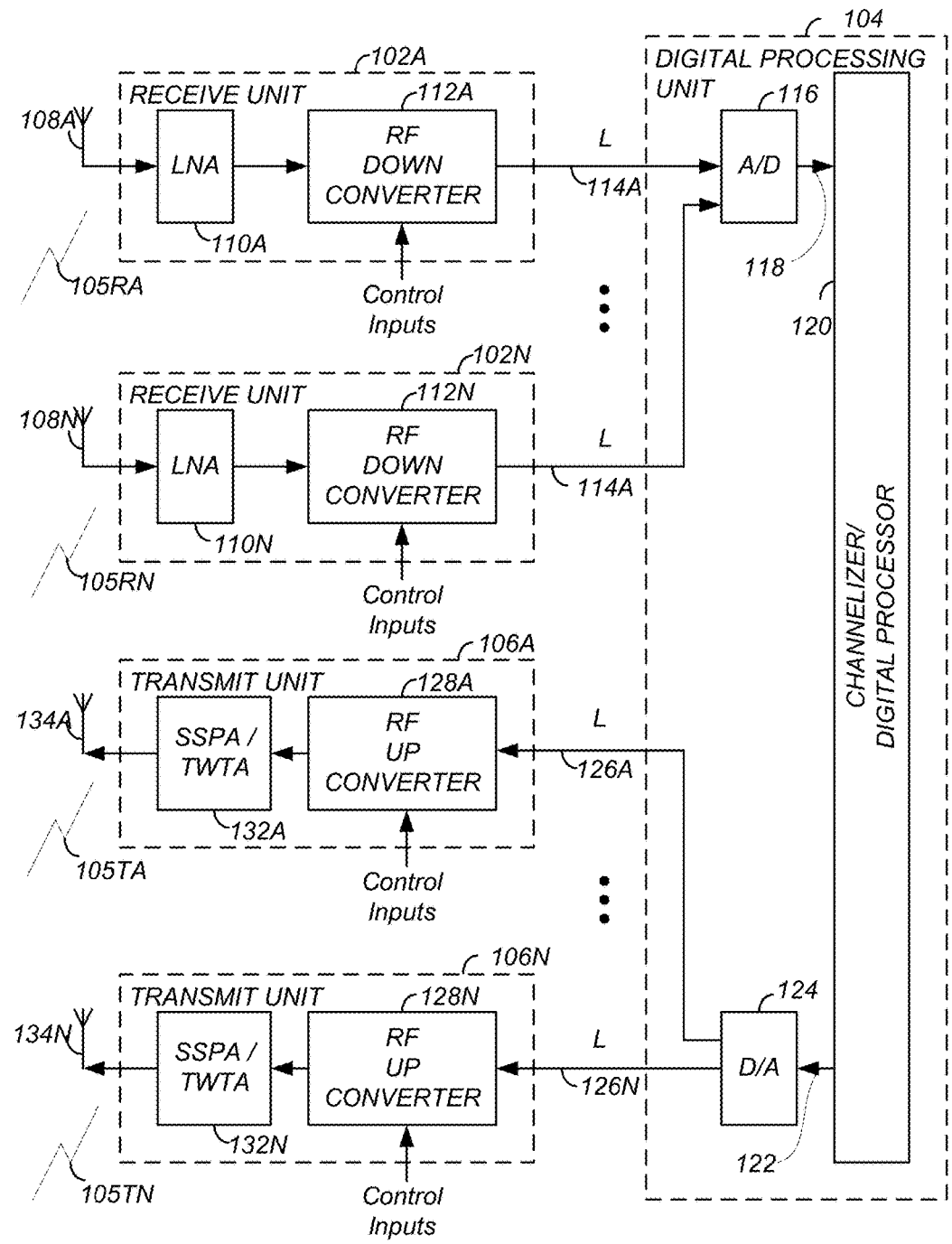
FIG. 2 is a diagram illustrating a transceiver modified to transceive broader band signals than the transceiver illustrated in FIG. 1.

FIG. 2 is a diagram illustrating a modified transceiver 200. The transceiver 200 has been modified to include a plurality of receive units 102A-102N and a plurality of transmit units 106A-106N. Each receive unit 102-102N is responsible for receiving a different bandwidth portion of the receive signal 105RA-105RN, and providing a 500 MHz bandwidth signal in the L-band to the DPU 104. Each transmit unit 106A-106N accepts the 500 MHz, L band signal 126A-126N from the DPU 106 and generates and transmits an associated transmit signal 105TA-105TN on the appropriate portion of the spectrum.

Figure 5:
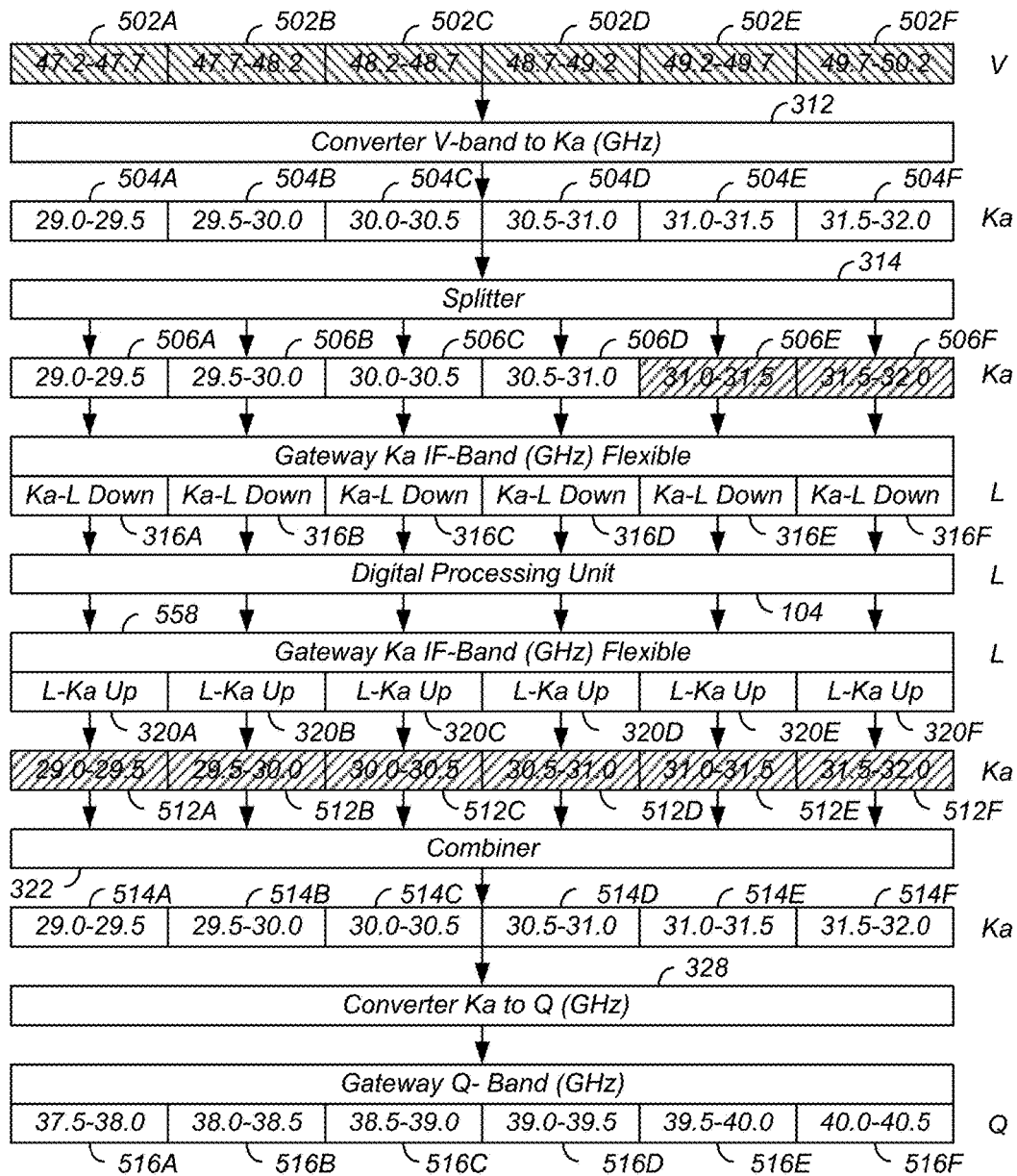
FIG. 5 is a diagram illustrating an exemplary frequency plan for the broadband transceiver.

The difficulty with the modified transceiver 200 illustrated in FIG. 5 is that both the receive units 102A-102N and the transmit units 106A-106N are expensive and difficult to produce. Since these devices must operate in millimeter frequency bands (for example, Q-band, V-band and W-band), these devices include waveguides of very small size that must be produced to very tight tolerances. Accordingly, while the modified transceiver 200 can transceive signal on newly available frequency bands, this capability comes at great expense.

Figure 3:
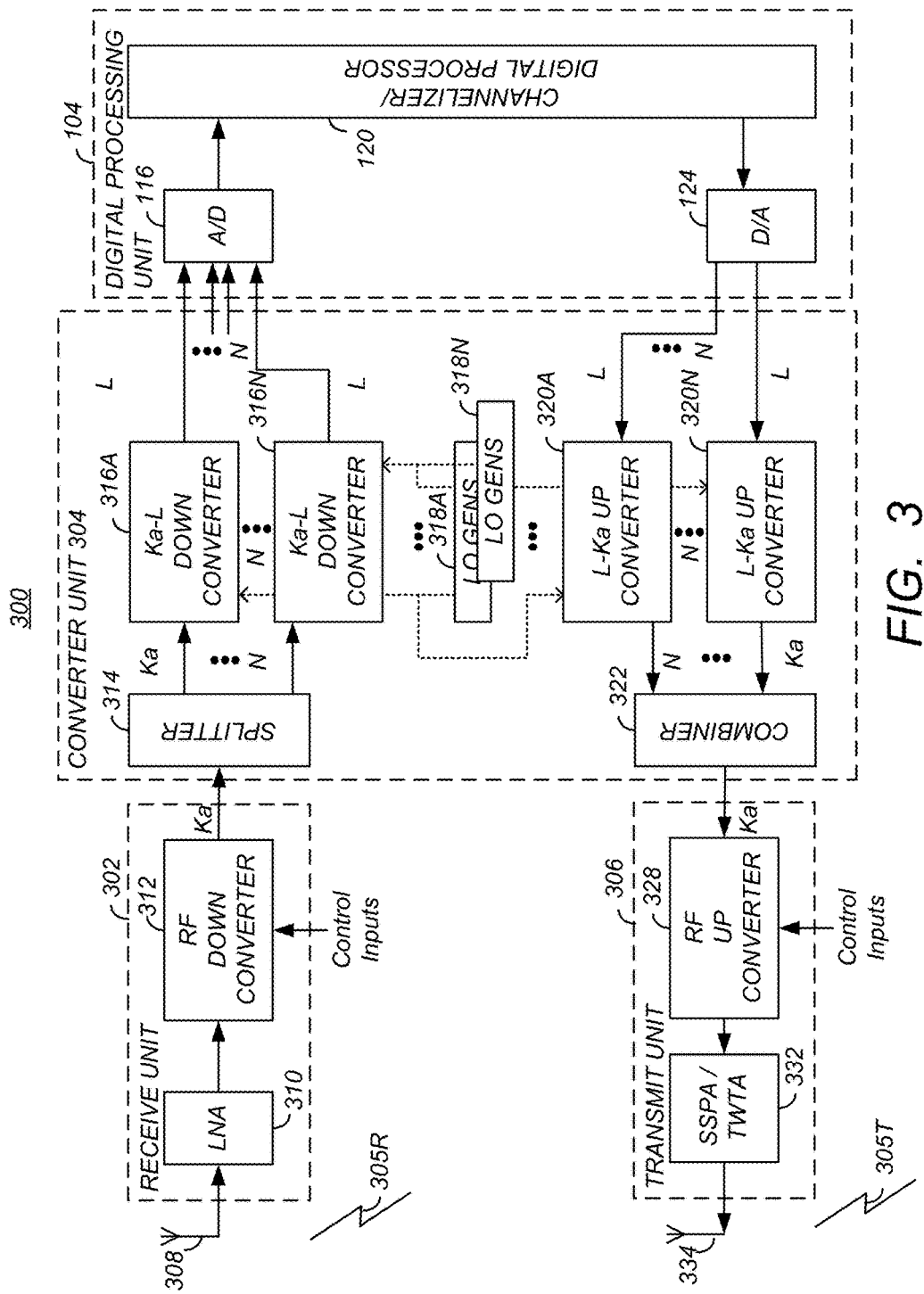
FIG. 3 is a diagram of an improved broadband transceiver.

FIG. 3 is a diagram of an improved broadband transceiver 300. This improved broadband transceiver (hereinafter simply referred to as transceiver 300) comprises a receive unit 302 and a transmit unit 306 that has been modified to transceive signals at higher frequency bands, as well as the digital processing unit 104 discussed earlier with respect to the baseline transceiver 100. Unlike the digital processing unit 104 in the baseline transceiver 100 illustrated in FIG. 1, the digital processing unit 104 illustrated in FIG. 3 is configured to process a plurality of signals (e.g. from downconverters 316A-316N). The transceiver 300 also includes a converter unit 304 that converts the downconverted signals from the receive unit 302 into signals to be processed by the DPU 104 and also converts digitally processed signals from the DPU 104 into signals to be transmitted by the transmit unit 306. This transceiver 300 has the ability to transceive signals in the higher Q, V and W frequency bands, at lower cost compared to the design illustrated in FIG. 2, and is discussed below with reference to FIG. 4 and FIGS. 5A-5B.

Figure 4:
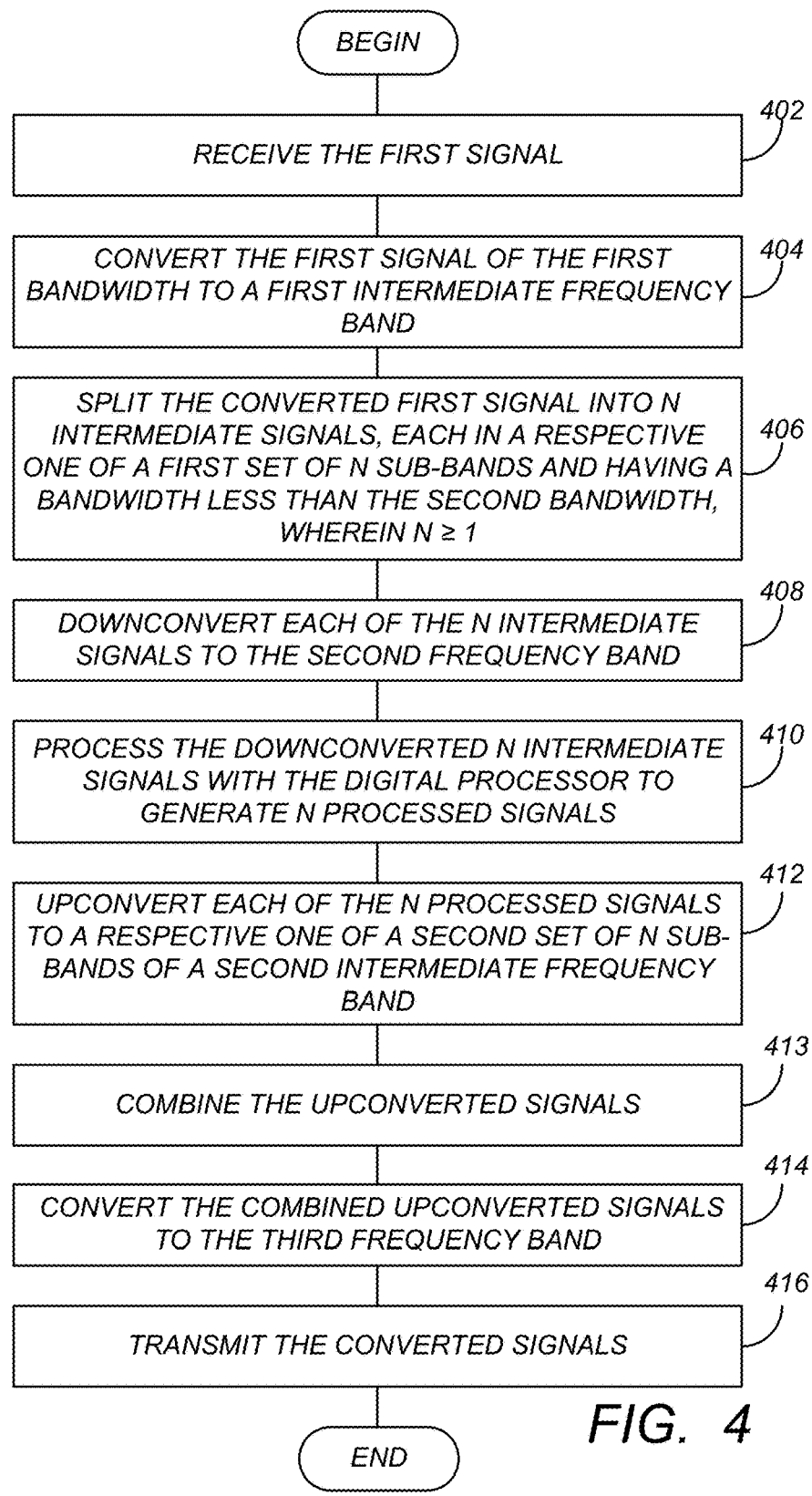
FIG. 4 is a diagram presenting exemplary operations that may be used to receive and process broadband signals.

FIG. 4 is a diagram presenting exemplary operations that may be used to receive and process signals. Referring to block 402, a first signal such as the receive signal 305R depicted in FIG. 3 is received. This first signal 305R is in a first frequency band and of a first bandwidth, for example, a V band signal of 3 GHz bandwidth. This can be accomplished, for example, by antenna 308 and LNA 310 of the receive unit 302. In block 404, the received first signal 305R is converted from the first frequency band to a first intermediate frequency band. This can be accomplished, for example, by the RF converter 312 of the receive unit, which converts the amplified version of the received signal V-band signal into an intermediate frequency band in the Ka-band, for example. In one embodiment, the intermediate frequency band that the received first signal 305R is converted into is determined such that its selection optimally minimizes the generation of spurs (described further below), and maximizes the reuse of existing hardware, which can be implemented by sharing hardware (e.g. one or more of the local oscillators 318 between the down converters 316 and upconverters 320). In one of the embodiments discussed below, an intermediate frequency band of 29.0-32.0 GHz is chosen, because that intermediate frequency band provides an optimal combination of spur minimization, reuse of existing downconverters 316, and sharing of local oscillators 318 between the downconverters 316 and the upconverters 320, as further described below.

Referring to block 406, the converted first signal (now in the intermediate band) is split into N intermediate signals, each in a respective one of a first set of N sub-bands, wherein N≥1. In one embodiment, the number of intermediate signals N is chosen so that each of the N intermediate signals has a bandwidth equal to or less than the maximum bandwidth of a signal that can be processed by the DPU 104. For example, if the DPU 104 is capable of processing 500 MHz signals, each of the N intermediate signals will be no greater than 500 MHz. If the received signal is a 3 GHz signal, it will be split into at least six (3/0.5) signals, each occupying a different (and optionally contiguous) sub-band of the 3 GHz bandwidth signal. In the illustrated embodiment of FIG. 3, this operation is performed by splitter 314, which splits the intermediate band (Ka, in this example) signal from the RF down converter 312 into N Ka band signals.

Next, in block 408, each of the N intermediate signals is downconverted into a second frequency band. In the embodiment illustrated in FIG. 3, this is accomplished by N down converters 316A, each of which downconvert an associated signal from the splitter 314 from the associated one of the first set of N sub-bands of the intermediate frequency band (in the illustrated embodiment, the Ka band) to an associated sub-band of the second frequency band (in the illustrated embodiment, the L band). The result is N L-band sub-band signals, each of bandwidth equal to or less than the bandwidth of the receive signal 305R divided by N.

Each of the downconverters 316A-316N included in the converter unit 304 is communicatively coupled with an associated one of a plurality of local oscillators 318A-318N. For example, downconverter 316A is communicatively coupled to local oscillator 318A, and converter 316N is communicatively coupled to local oscillator 318N. The converters 316A-316N each receive a local oscillator signal from their associated local oscillator, and use that local oscillator signal in the downconversion process.

The N downconverted intermediate signals are next processed with a digital processor to generate N processed signals, as described in block 410 of FIG. 4. In the embodiment depicted in FIG. 3, this is accomplished when each of the downconverted intermediate signals are provided to one or more A/D converters 116, and the resulting digitized signals (of 500 MHz bandwidth each, in the illustrated embodiment) are provided to a channelizer/digital processor 120 for processing. The resulting processed signals are next provided to one or more D/A converters 124 to produce N processed digital signals.

In block 412, each of the N processed signals is upconverted to a respective one of a second set of N sub-bands in the second intermediate frequency band. In the exemplary embodiment presented in FIG. 3, this is accomplished by upconverters 320A-320N, with each of the upconverters 320A-320N upconverting one of the sub-bands in the second frequency band (L-band in this illustrated embodiment) to an associated one of the sub-bands of the second intermediate frequency. We shall note that in the illustrated example in FIG. 3, the second intermediate frequency band is selected to be the same as the first intermediate frequency band; namely, Ka.

As noted above, each of the upconverters 320A-320N upconverts the associated one of the signals in the N sub-bands of the second frequency band to an associated one of the second set of N sub-bands of the second intermediate frequency band using a local oscillator signal from an associated local oscillators. We shall note that the local oscillators associated with the up-convertors, 320A-320N, may or may not be the same local oscillators 318A-318N associated with the down-convertors 316A-316N. The number of local oscillators required for the implementation of this system can thus vary depending on various optimization criteria. It can be 2N: one for each down-convertor 316A-316N, and one for each up-convertor, 320A-320N. Or N local oscillators: each associated to a one down-convertors selected from 316A-316N and a one up-convertor selected from 320A-320N simultaneously. Or any other possible configuration.

Returning to FIG. 4, the upconverted signals are combined and the combined upconverted signals are converted to a third frequency band, as shown in blocks 413 and 414. This can be accomplished for example, by combining each of the upconverted signals (for example, with combiner 322), and providing the combined upconverted signals to the RF upconverter 328 of the transmit unit 306. The upconverter 328 upconverts the signals according to control inputs. Note that the third frequency band may or may not be the same as the first frequency band. In the illustrated example of FIG. 5, the third band is selected to be the Q band spanning frequencies 37.5 to 40.5 GHz.

Finally, the converted signals are transmitted, as shown in block 416. This can be accomplished, for example, by providing the upconverted signal to an amplifier 332 such as a traveling wave tube amplifier (TWTA) or solid state power amplifier (SSPA), and the amplified signal is provided to transmit antenna 334 for transmission of the transmit signal 305T.

As noted above, various optimization criteria can be used to select the first and the second intermediate frequency bands and the first and the second set of N sub-bands. For example, any or all of the N (Ka) sub-bands created by the splitter 314 can be advantageously selected to be coextensive in frequency with the N (Ka) sub-bands combined by the combiner 322. This simplifies the design by requiring only N local oscillators 318 instead of 2 N local oscillators, as they provide the same LO signals for the upconversion and downconversion process. In such embodiments, one or more of the local oscillators 318 and the local oscillator signals they produce are shared by one or more of the down converters 316 and associated up converters 320. For example, the local oscillator signal produced by local oscillator 318A (provided to downconverter 316A for downconverting from a sub-band of the first set of N sub-bands to the second frequency band) may also be provided to the upconverter 320A for upconverting the processed signal to a sub-band of a second set of N sub-bands that is coextensive in frequency with the sub-band of the first set of sub-bands (for example, sub-band 504A is coextensive with sub-band 514A). The result is that fewer local oscillators 318 are required.

This is made possible by selecting one or more of the first set of N sub-bands used in the transmission (e.g. 504A-504F) to be coextensive in frequency with an associated sub-band of the second set of N sub-bands (514A-514F) used in transmission. For example, any or all of the N intermediate signals may be downconverted (e.g. by the associated one of the downconverters 316A-316N) from a Ka sub-band to the L band, and an associated one of the N processed signals may be upconverted (e.g. by the associated one of the upconverters 320A-320N) from the L-band to same (Ka) sub-band.

It is also noteworthy that the first intermediate frequency band (e.g. frequency band of the signal emanating from RF downconverter 312) need not be coextensive with the second frequency band (e.g. the frequency band of the signal provided to the RF upconverter 328). Instead, the first intermediate frequency band may include only some frequencies that overlap with those of the second intermediate frequency band. Even in such cases, one or more of the sub-bands of the first intermediate frequency can be chosen to be coextensive in frequency with an associated one or more of the sub-bands of the second intermediate frequency, thus providing for savings in the circuitry required to generate the local oscillator signals required to perform the upconversion and downconversion of the signals. Judicious selection of the first intermediate frequency band and second intermediate band, along with the first and second sets of N sub-bands in the respective first and second intermediate bands maximizes re-use of existing hardware, minimizes amount of additional elements (e.g. local oscillators 318) that are required, and minimizes the number of spurs (as further described below), while maintaining signal quality.

Although the greatest savings in the number of local oscillators 318 and associated circuitry can be realized when every one of the first set of N sub-bands used in transmission (e.g. 504A-504F) is coextensive in frequency with the associated one of the second set of sub-bands (e.g. 514A-514F, respectively), savings can still be obtained when only one of the first set of sub-bands is selected to be coextensive in frequency with one of the second set of sub-bands. For example, the first set of sub-bands and second set of sub-bands may be chosen such that only two sub-bands of the first set of sub-bands is coextensive in frequency with an associated two sub-bands of the second set of sub-bands. Referring to FIG. 5, this may be accomplished by selecting sub-bands 504A and 504C to be coextensive in frequency with sub-bands 514A and 514C, respectively, for further example.

FIG. 5 is a diagram illustrating an exemplary frequency plan for the broadband transceiver 300. In this illustrated embodiment, the receive signal 305R is a V-band signal between 47.2 and 50.2 GHz. That signal may comprise a plurality of contiguous sub-bands 502A-502F as indicated in the diagram. That signal (following reception and low noise amplification) is downconverted (e.g. by downconverter 312 using control inputs) to a Ka band signal spanning 29.0-32.0 GHz, which may also be thought of as comprising a plurality of contiguous sub-bands 506A-506F. Those sub-bands 506A-506F are separated into separate signals by splitter 314, and each such signal is provided to an associated downconverter 316A-316F. As illustrated, each of such signals has 500 MHz of bandwidth, and thus does not exceed the processing capacity of the DPU 104. Each of the signals is downconverted to an associated sub-band of the L-band before being provided to the DPU 104 for processing. Following such processing, the processed signals are upconverted by upconverters 320A-320F. Note that although FIG. 5 illustrates an embodiment in which the the processed signals are upconverted to the same (e.g. frequency coextensive) Ka sub-bands that were created by splitter 314, the processed signals may be upconverted to different non-coextensive in frequency) sub-bands if desired. The upconverted signals are then combined by combiner 322, and converted from Ka-band to Q-band by converter 328. The resulting Q-band signal spans the 37.5-40.5 GHz bandwidth, formed by 500 MHz sub-bands 516A-516F as illustrated in FIG. 5.

FIG. 5 also indicates which frequency allocations permit the re-use of existing hardware. Existing hardware operates in the Ka band from 27-31 GHz. However, for purposes of spur minimization and the use of same local oscillators for both the downconverters 316 and upconverters 320, it is desirable for the intermediate frequency to extend from 29 GHz to 32 GHz. This permits re-use of existing downconverters 316 for the 29-31 GHz bands 506A-506D. Sub-bands that cannot be implemented with re-used hardware are those indicated by forward-slashing, and include sub bands disposed between 31.0 and 32.0 GHz.

Hence, as previously discussed, V-band sub-bands 502A-502F are new, and require a different converter 312 than the converter 102 of FIG. 1 to accommodate the different frequency band and bandwidth. Downconverters 316A-316D for downconverting signals to Ka sub-bands 506A-506D are used in existing frequency plans and do not require modification. Ka sub-bands 506E and 506F are not part of a current frequency plan, and minor modification of downconverters 316E-316F (as indicated by forward slashing) is required. Minor modifications are also required of upconverters 320A-320F. Converter 328 converts to the Q-band and hence requires significant modification, as indicated by back-slashing.

Figure 6:
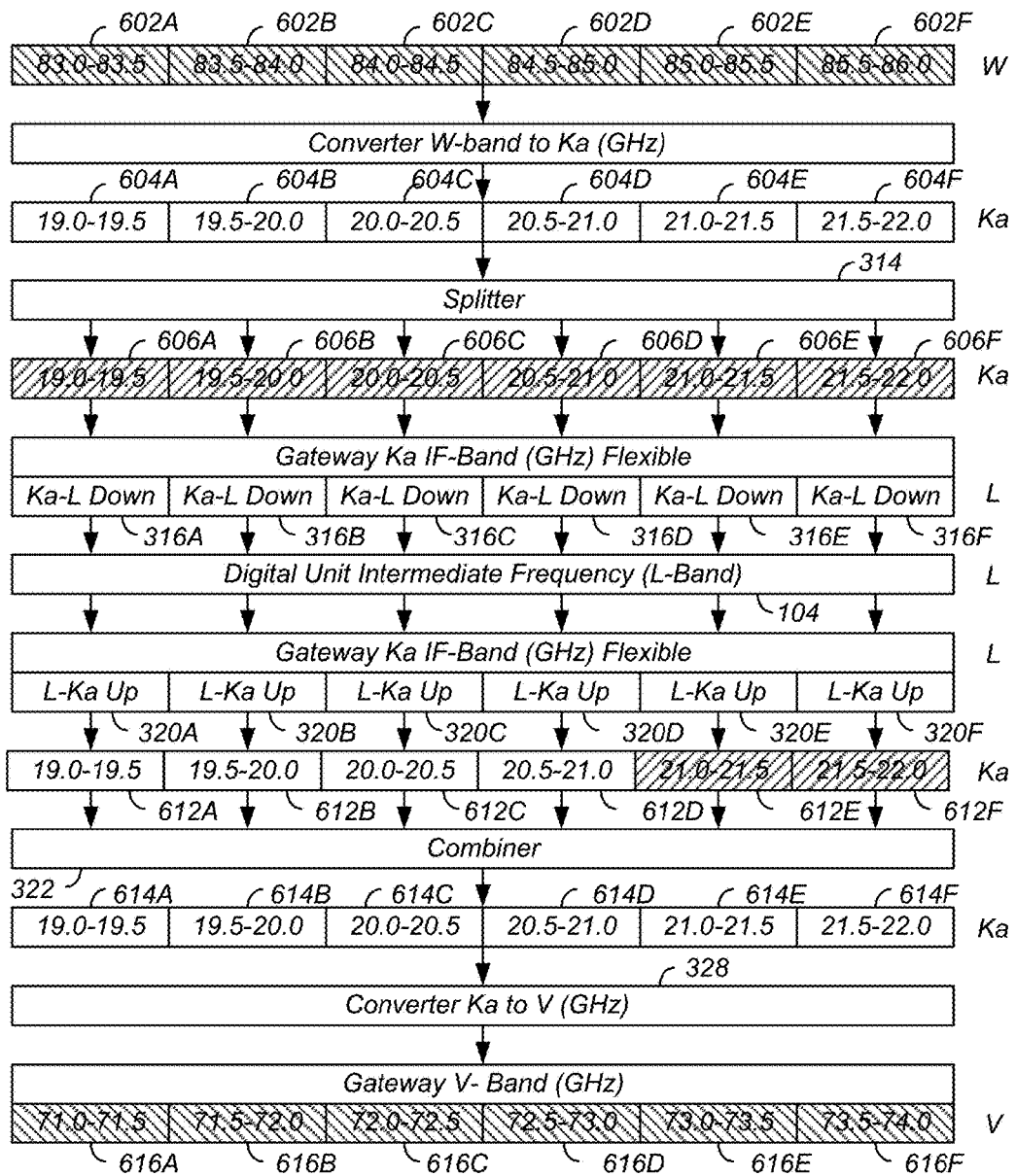
FIG. 6 is a diagram illustrating another exemplary frequency plan for the broadband transceiver.

FIG. 6 is a diagram illustrating another exemplary frequency plan for the transceiver 300. In this illustrated embodiment, the receive signal 305R is a W-band signal between 83.0 and 86.0 GHz. That signal may comprise a plurality of contiguous sub-bands 602A-602F as indicated in the diagram. That signal (following reception and low noise amplification) is downconverted (e.g. by downconverter 312 using control inputs) to a Ka band signal spanning 19.0-22.0 GHz, which may also be thought of as comprising a plurality of contiguous sub-bands 606A-606F. Those sub-bands 606A-606F are separated into separate signals by splitter 314, and each such signal is provided to an associated downconverter 316A-316F. As illustrated, each of such signals has 500 MHz of bandwidth, and thus does not exceed the processing capacity of the DPU 104. Each of the signals is downconverted to an associated sub-band of the L-band before being provided to the DPU 104 for processing. Following such processing, the processed signals are upconverted by upconverters 320A-320F. Note that the processed signals are upconverted to the same Ka sub-bands that were created by splitter 314. The upconverted signals are then combined by combiner 322, and converted from Ka-band to V-band by converter 328. The resulting V-band signal spans the 71.0-74.0 GHz bandwidth, formed by 500 MHz sub-bands 616A-616F as illustrated in FIG. 6.

As was true with FIG. 5, FIG. 6 also indicates which frequency allocations permit the re-use of existing hardware. Existing hardware operates in the Ka band from 27-31 GHz. However, for purposes of spur minimization and the use of same local oscillators for both the downconverters 316 and upconverters 320, it is desirable for the intermediate frequency to extend from 19 GHz to 22 GHz. This permits re-use of existing upconverters 320 for the 19-21 GHz bands 612A-612D. Sub-bands that cannot be implemented with re-used hardware are those indicated by forward-slashing, and include sub bands disposed between 31.0 and 32.0 GHz.

Hence, as previously discussed, the downconverters associated W-band sub-bands 602A-602F cannot be reused from existing hardware, and require a different converter 312 than the converter 112 of FIG. 1 to accommodate the different frequency band and bandwidth. Ka sub-bands 606A-606F are not part of a current frequency plan, and modification of downconverters 316A-316F (as indicated by forwardslashing) is required. Modifications are also required of upconverters 320E and 320F. However, upconverters 320A-320D for upconverting signals to Ka sub-bands 614A-614F are used in existing frequency plans and existing upconverters may be re-used.

Selected components of the transceiver 300 typically produce undesirable harmonics and spurs that reduce transceiver 300 performance. For example, downconverters 316A-316N operate by mixing the input signal with the local oscillator signal from the respective local oscillator 318A-318N. Ideally, this process should simply downconvert the signal content of the input signal to the desired frequency band, but in practice, non-linearities and other limitations of the hardware result in harmonic distortion that is comprised of signal components at harmonics of the input signal and local oscillator signal and their combination. Such harmonics are known as spurs. The frequency allocation plans described in FIG. 5 and FIG. 6 is the result of optimizing the selection of the intermediate frequency band (for example, the Ka band) and the sub-bands (for example the L sub-bands) minimize the generation of spurs in the operating bands of the transceiver 300. An example of such optimization will be detailed below.

Figure 7:
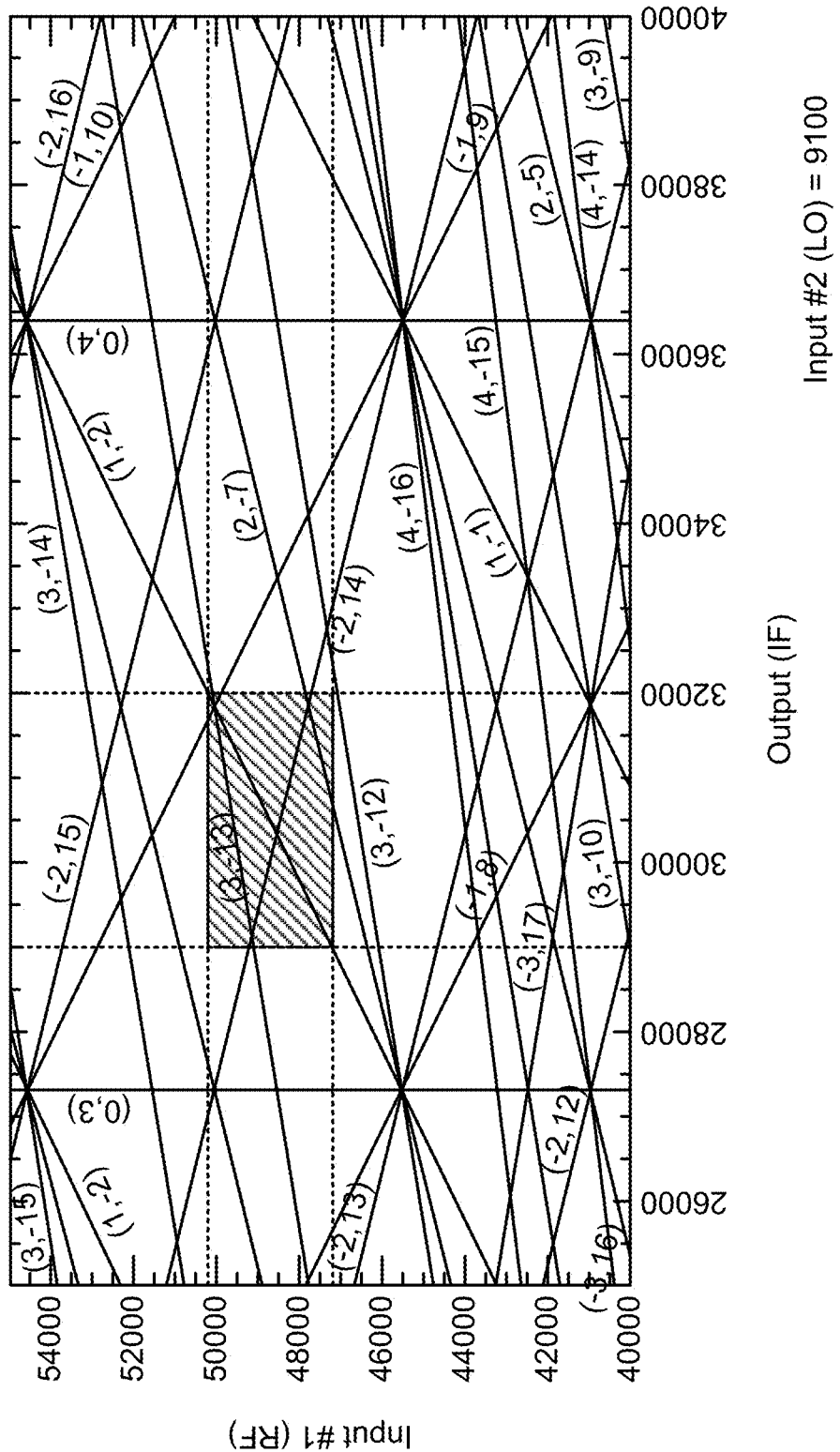
FIG. 7 is a diagram depicting spurs generated in the V-Ka band downconversion process.

FIG. 7 is a diagram depicting the frequency of spurs generated in the V-Ka band downconversion process. Such spurs are the product of imperfections in the mixing process taking place in the downconverters. The spur frequency, and hence its impact to the desired performance depends on the input frequency provided to the downconverter, the local oscillator frequency used by the downconverter, and the desired output frequency of the signal output by the downconverter.

The diagram depicted in FIG. 7 plots the frequency of the input (RF) signal on the vertical axis, the output frequency of spurs from the downconverter on the horizontal axis for a given local oscillator (LO) frequency (in the example illustrated in FIG. 7, the LO frequency is 9100 MHz, but others may be chosen). Each line on the plot is labeled with two numbers (m, n) wherein the first number (m) refers to a factor by which the input signal (input #1) frequency is multiplied, and the second number (n) refers to a factor by which the second input (input #2) frequency is multiplied. Further, the order of the "spur" is determined as the sum of absolute value of m and the absolute value of n. The shaded box in FIG. 7 represents the input frequencies to the RF downconverter 312 in the frequency plan illustrated in FIG. 5, namely from 47,200 MHz to 50,200 MHz, and the desired output IF frequencies of 29,000 MHz to 32,000 MHz.

With regard to the (1,−2) line, the value "1" refers to the fundamental of the input signal and the value "−2" refers to the 2nd harmonic of the LO input of 9100 MHz. Since the converter 312 uses a harmonic mixer and uses the 2nd harmonic of the LO input as the effective LO. Hence, the line labeled (1, −2) reflects the desired output mix product of the downconverter 312 and is not regarded as a spur to be avoided. The other lines presented on FIG. 7 refer to potential spurs.

Spurs and other distortions may be reduced or ameliorated by appropriate filtering by frequency (e.g. low pass, high pass, or bandpass filters). At the same time, it is not possible to construct filters with perfect bandpass characteristics, and filters with steep cutoff slopes typically induce phase distortions that may be seen in the frequencies also occupied by signal content. Accordingly, it is desirable that any high power spurs are to be located at frequencies farther from the passband, so that they may be more easily filtered out without introducing phase distortion. Such high power spurs are indicated in the diagram of FIG. 7 by those lines having a low |m|+|n| numbers or also know as spur order. Conversely, lines having lower numbers (e.g. those where m is zero) represent spurs that are difficult to remove by filtering, and are preferably avoided. What constitutes lower order spurs depends upon the application to which the system is to be used. For purposes of communication in the frequency regimes discussed in this application, it is preferable to avoid spurs of order 5 or less (e.g. |m|+|n|≤5).

In the illustrated case, the first input is the RF signal in the V-band and the second input is the from the local oscillator, which is set to 9100 MHz. The potential frequency location of spurs is determined by following a horizontal line from the input frequency to the diagonal lines, and reading the frequency of the potential spur on the x axis. Therefore, to determine the frequency of the third order spur defined by (0,3), a horizontal line is drawn from input#1 to the (0,3) line. This indicates the potential presence of a spur at about 27,500 MHz for all input#1 frequencies. This frequency is well out of the desired output band from 29,000-32,000 MHz, and hence not a problem.

Similarly, the frequency of the fourth order spur defined by (0,4) is determined by a horizontal line from input#1 to the (0,4) line, which shows a potential spur at about 36,400 Hz for all input #1 frequencies. Hence, the shaded area illustrated in FIG. 7 avoids the vertical lines (0, 3) and (0,4) and includes only higher order (>5) spurs. Accordingly, the use of the second harmonic of an local oscillator frequency of 9100 MHz to mix the 47,200-50,200 MHz frequency range down to 29,000-32,000 MHz range is a suitable choice.

The foregoing analysis can also be performed with respect to the downconversion process performed by downconverters 316A-316N, the upconversion process performed by upconverters 320A-320N, and the upconversion process performed by upconverter 328.

Figure 8A:
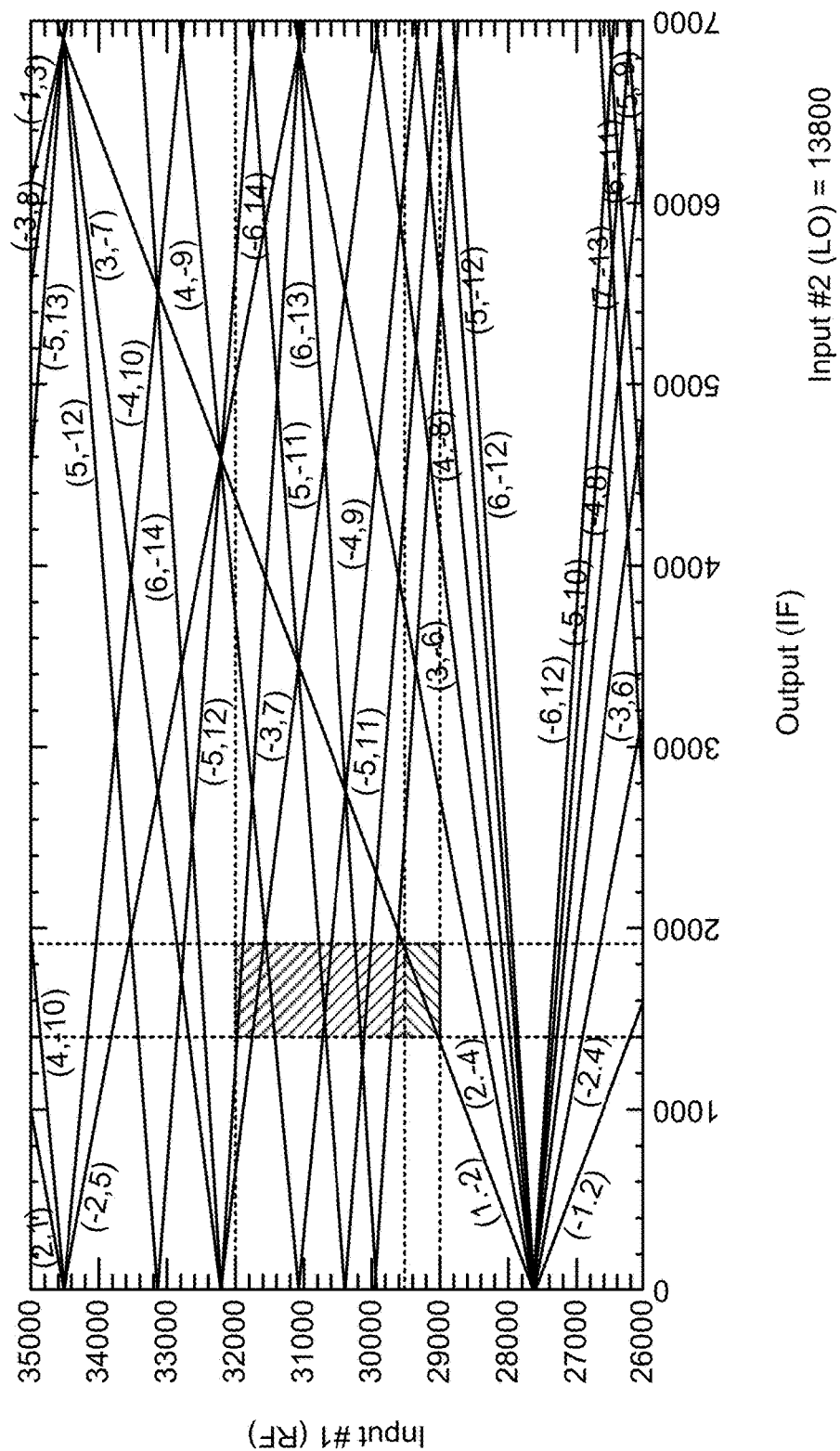
FIGS. 8A-8F illustrate the generation of spurs in the Ka-L band downconversion process.
Figure 8B:
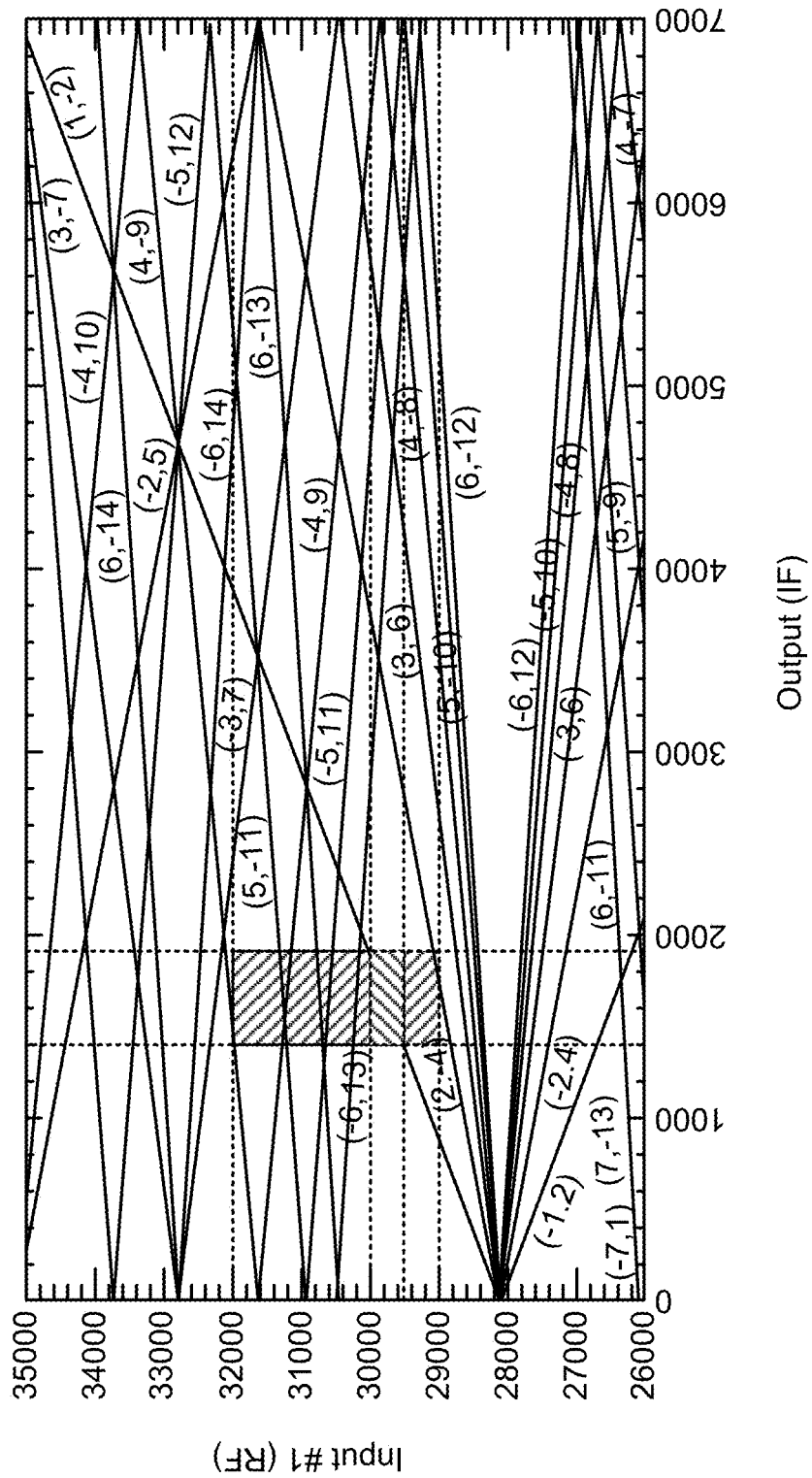
Figure 8C:
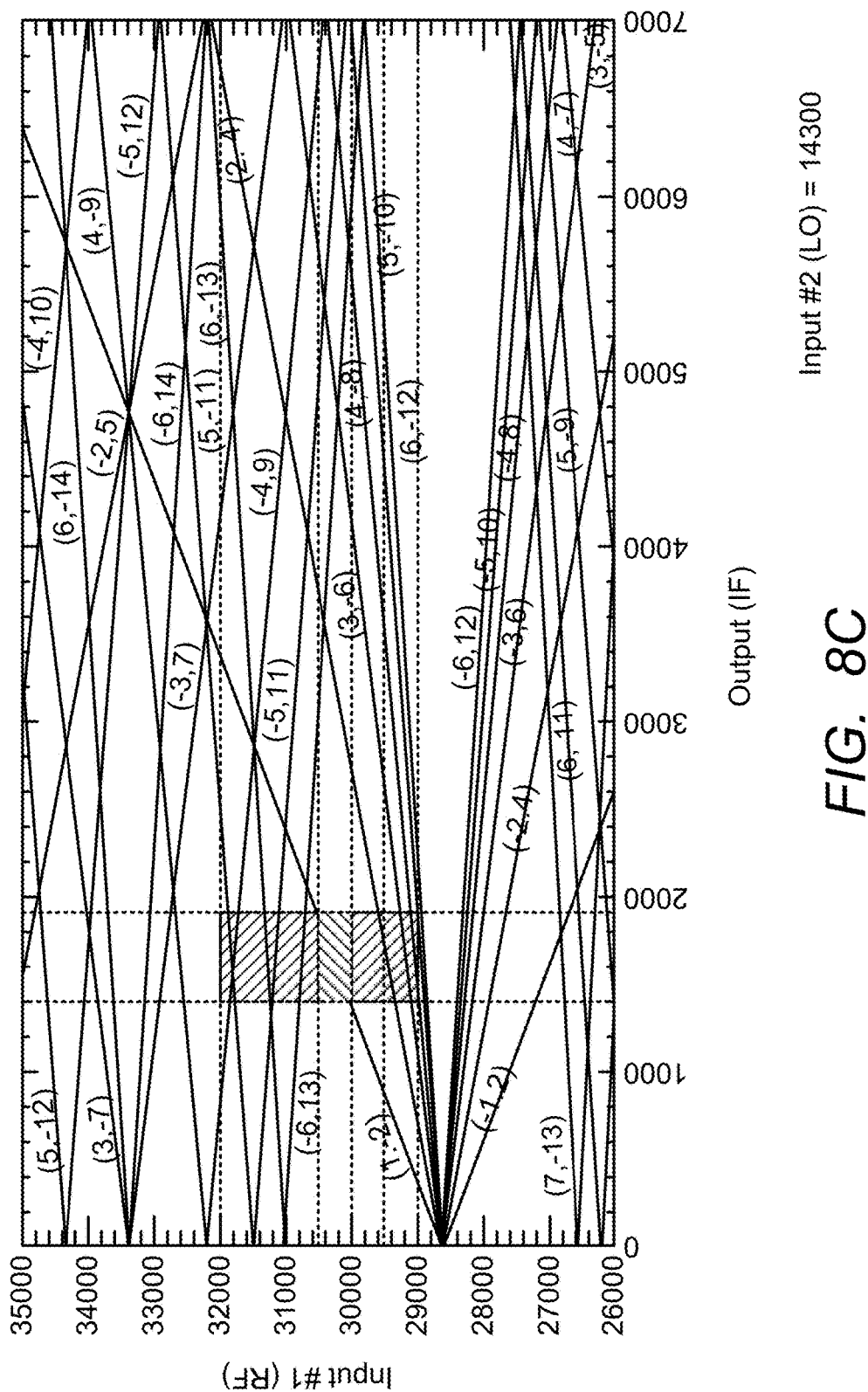
Figure 8D:
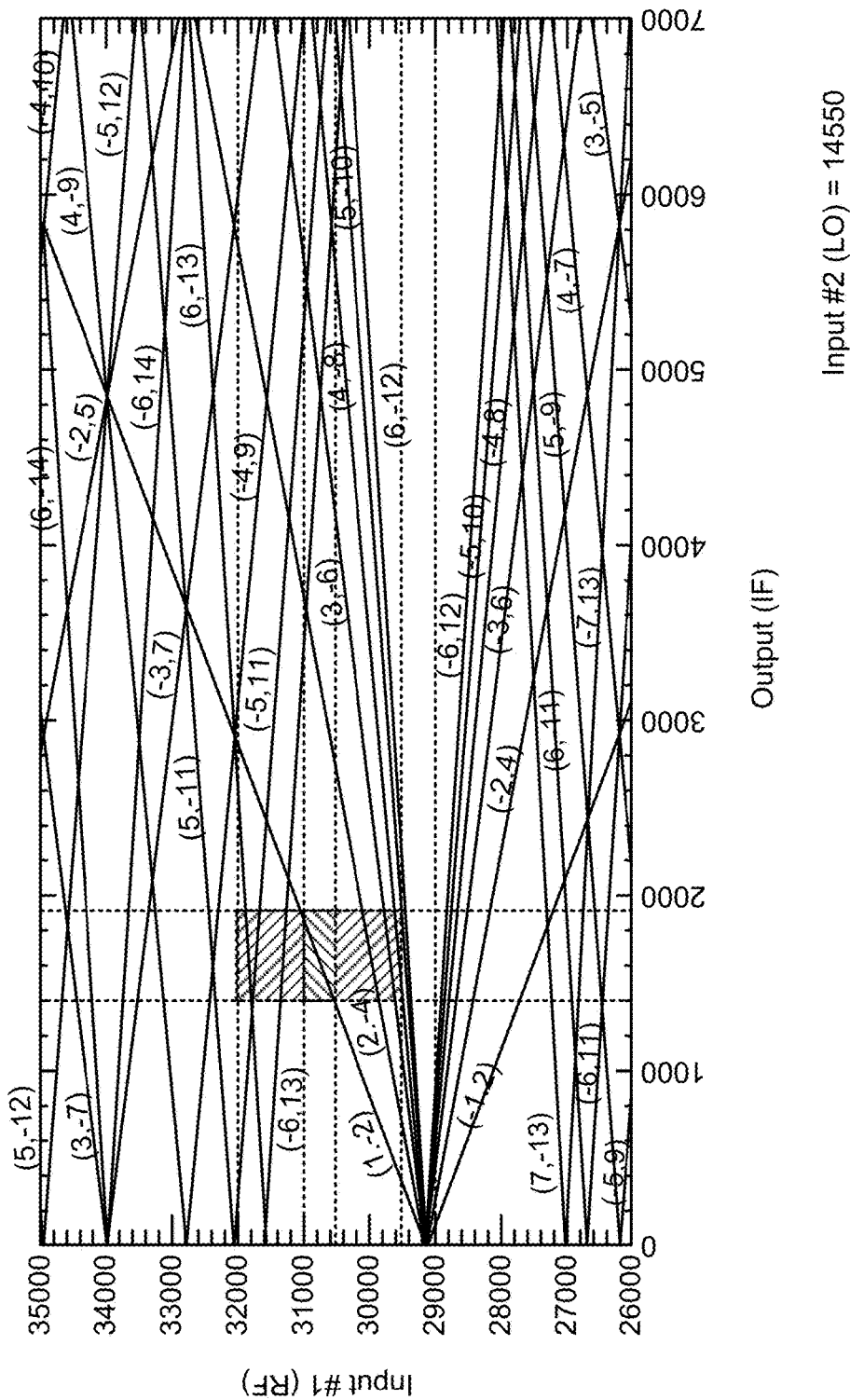
Figure 8E:
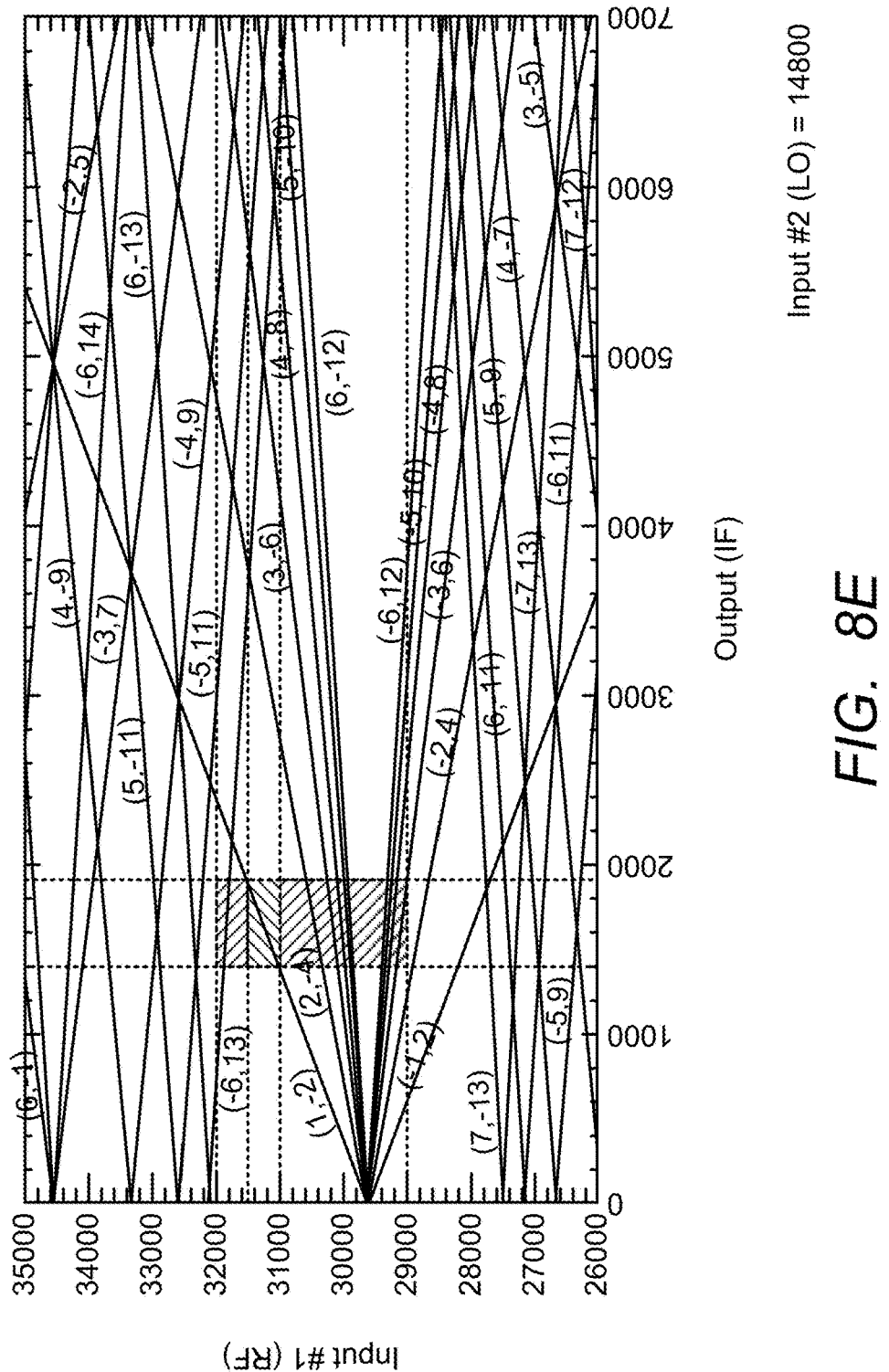
Figure 8F:
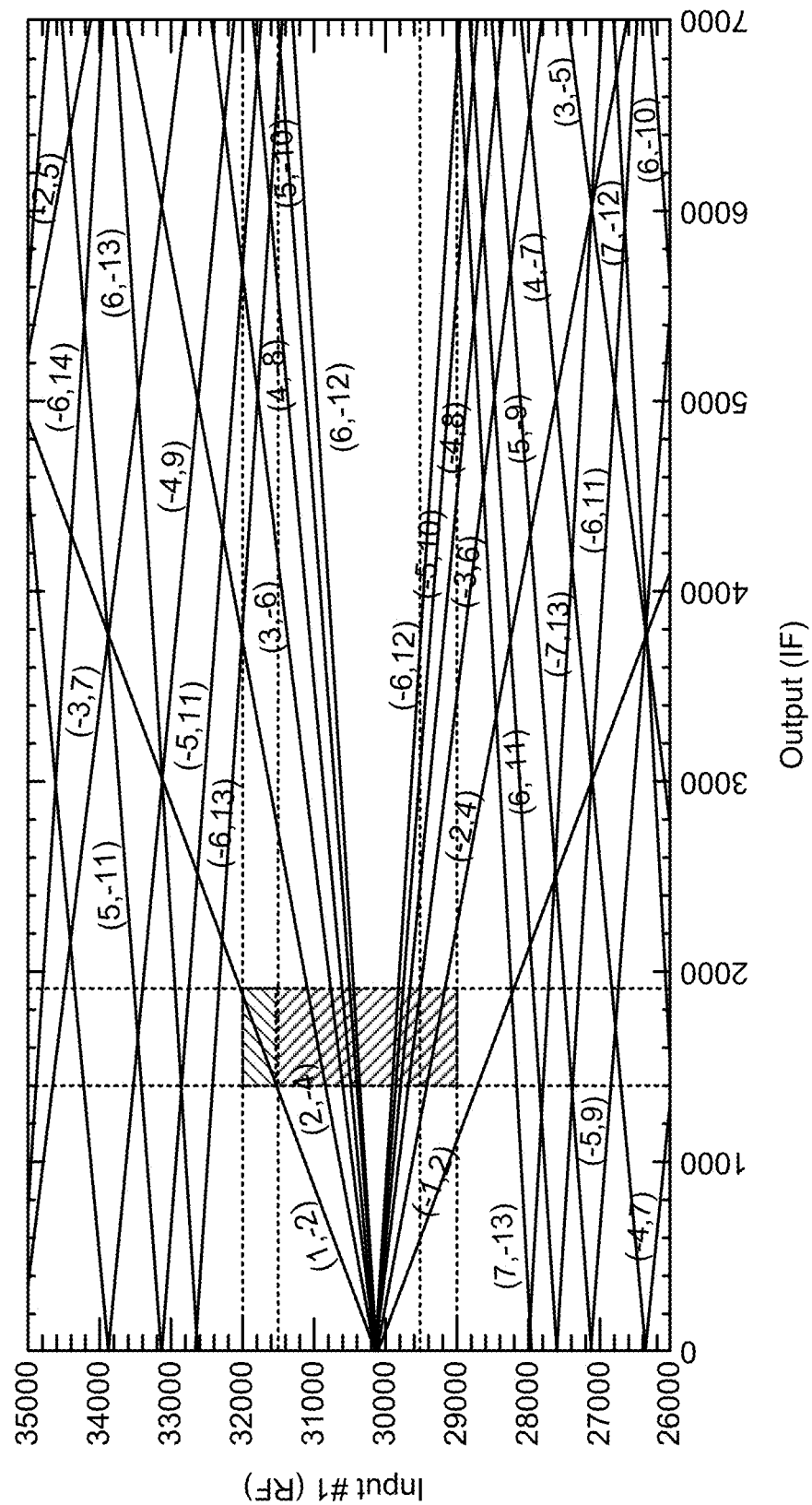

FIGS. 8A-8E illustrate the generation of spurs in the downconversion process, as performed by downconverters 316A-316F. FIG. 8A presents a plot of spur generation by downconverter 316A in the frequency plan illustrated in FIG. 5, while FIGS. 8B-8F present plots of spur generation by respective downconverters 316B-316F in the frequency plan illustrated in FIG. 5. Note that in each case presented, the generated spurs do not include any fundamentals (0, n), and comprise mostly higher order spurs that can be readily filtered. The forward-slashed boxes represent an analysis of the spurs potentially generated by each down converter 316, while the back-slashed boxes represent an analysis of the spurs potentially generated by the other downconverters 316 of the transceiver.

Figure 9A:
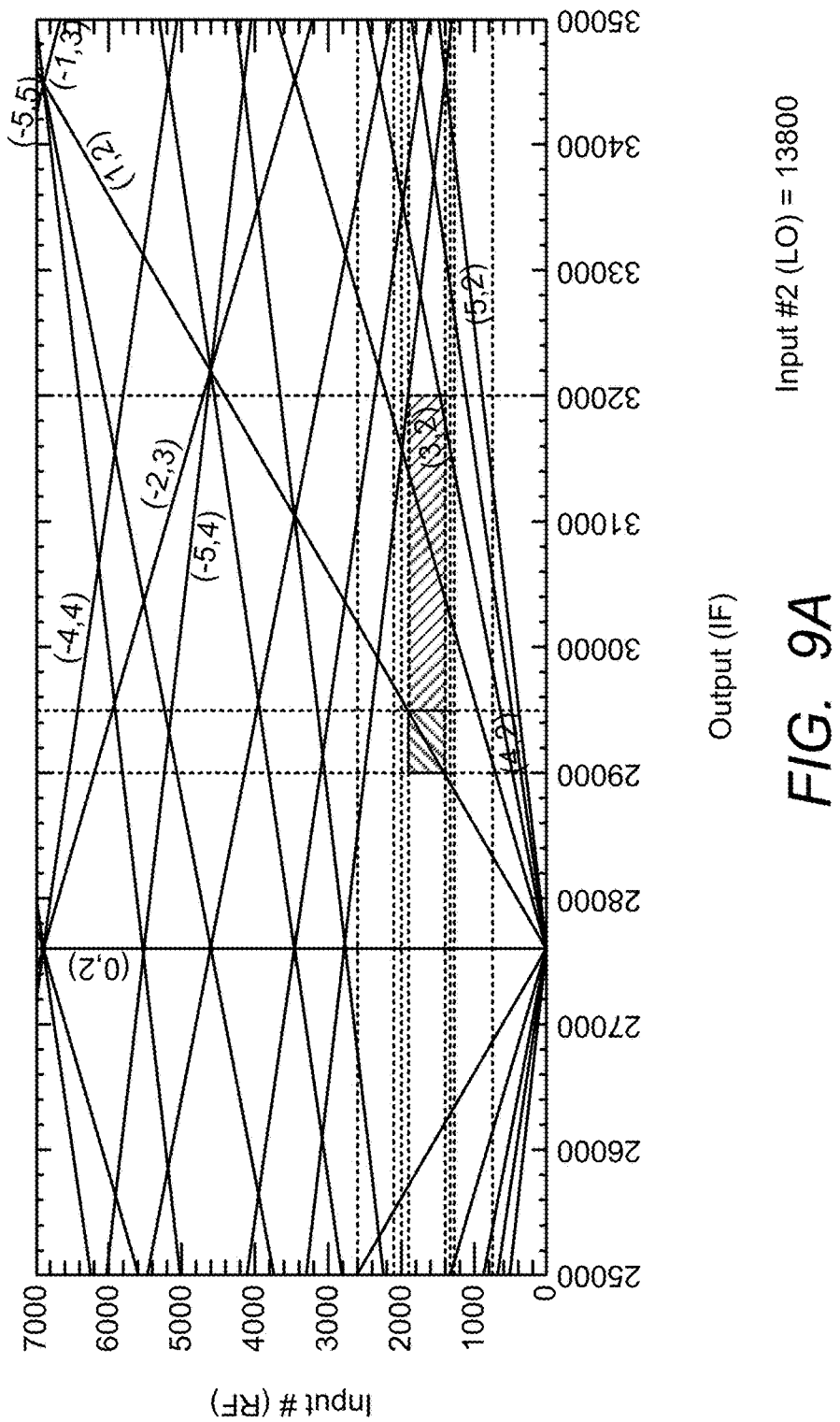
FIGS. 9A-9F illustrate the generation of spurs in the L-Ka band upconversion process.
Figure 9B:
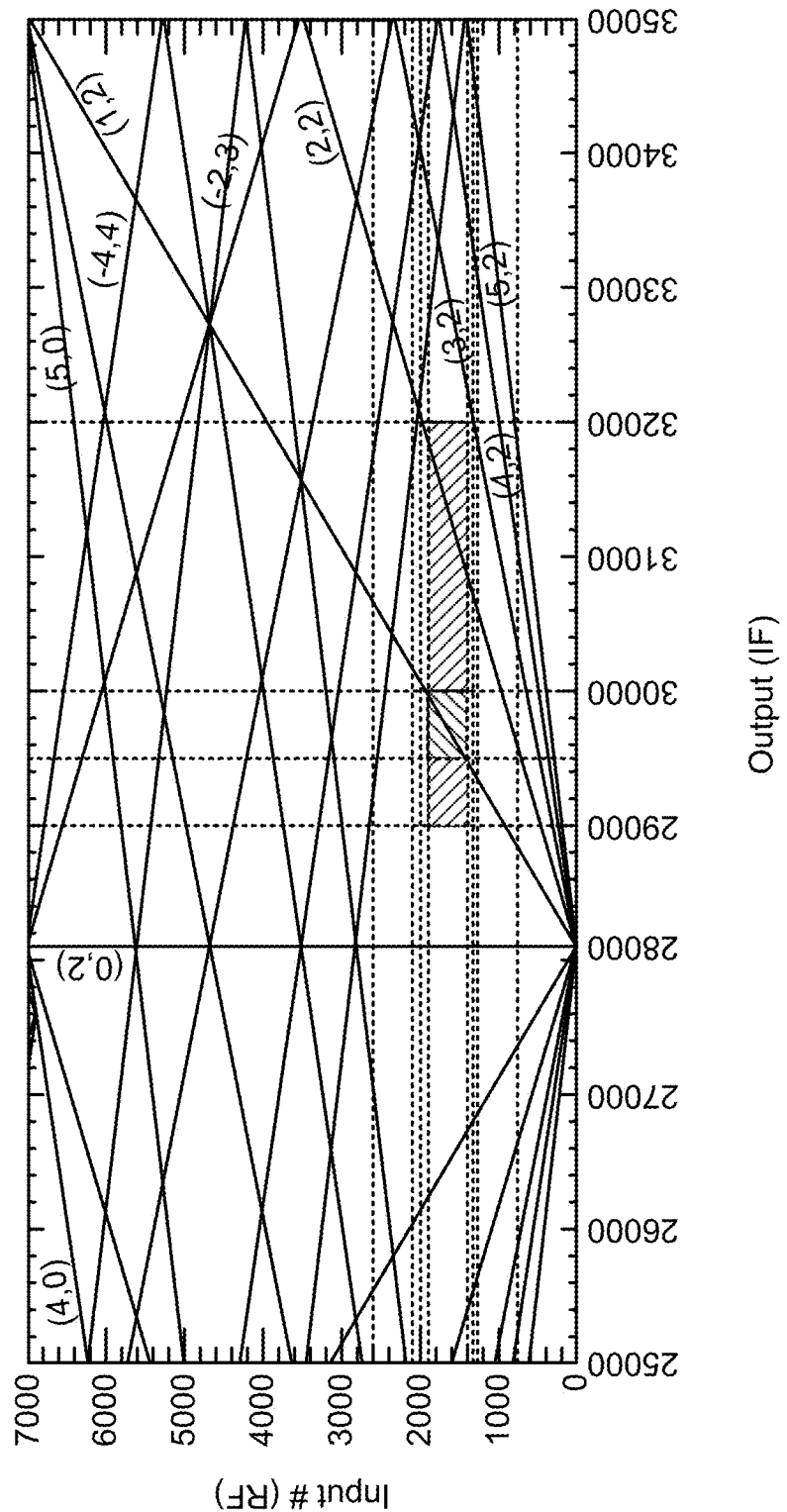
Figure 9C:
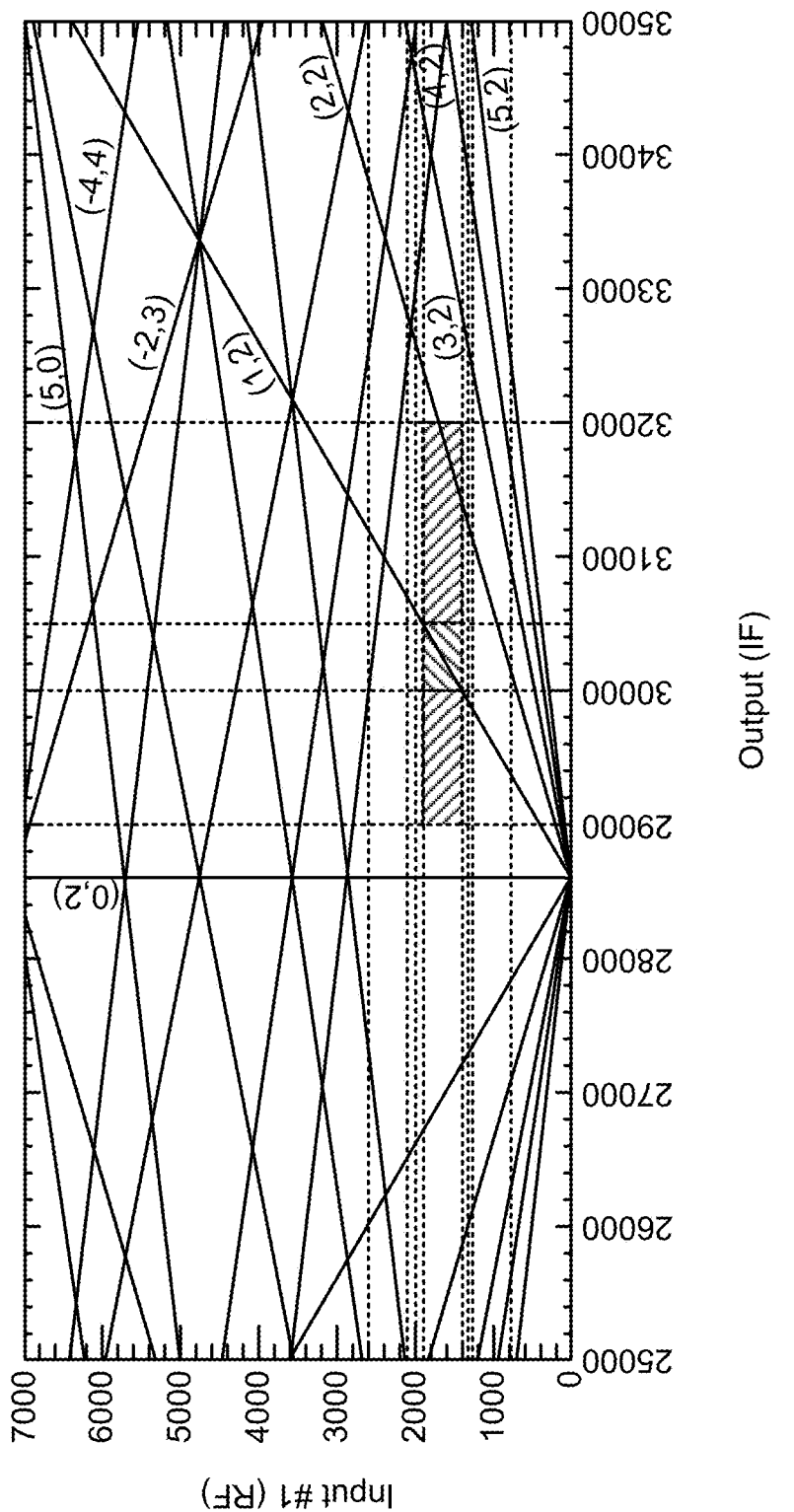
Figure 9D:
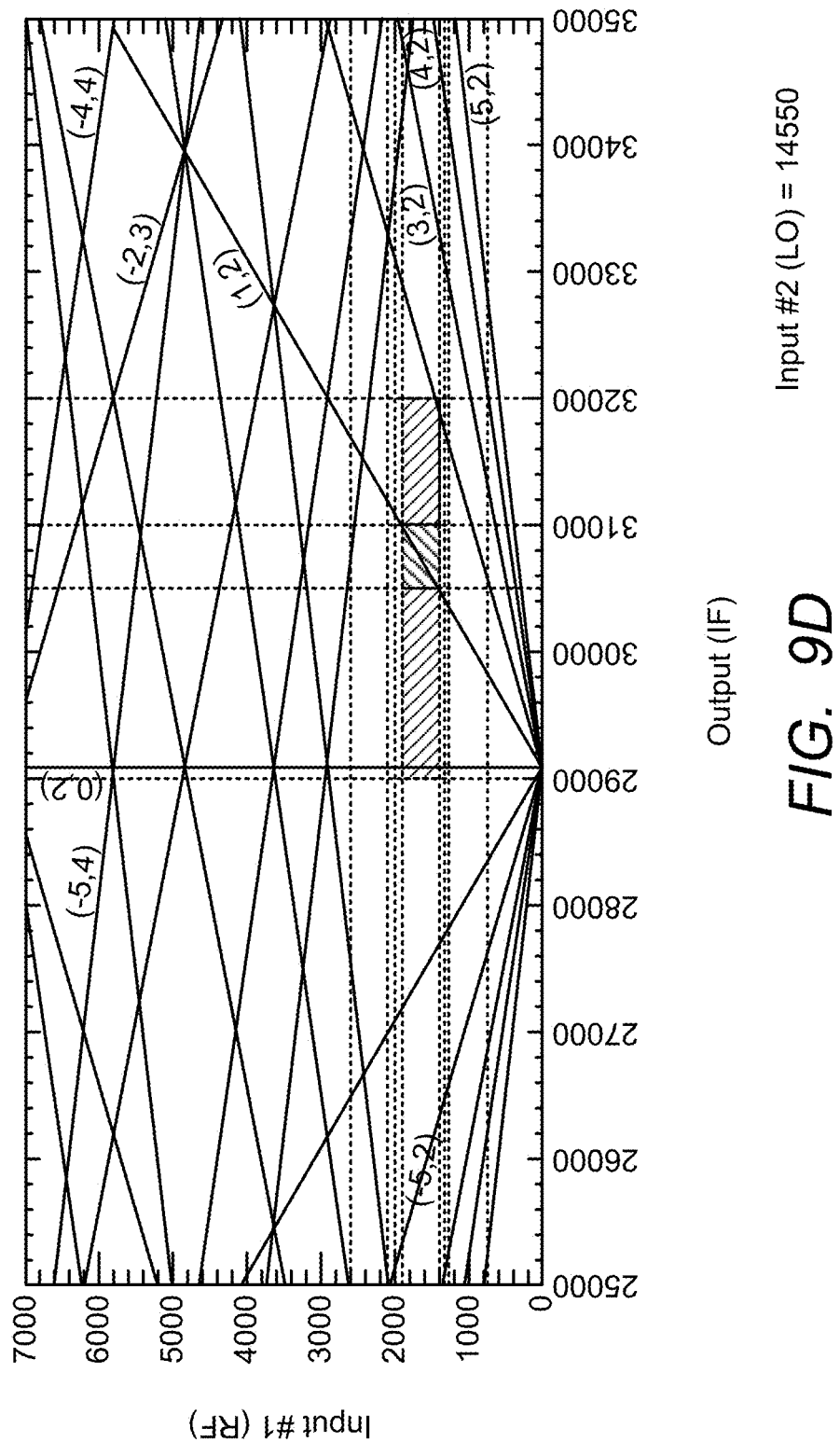
Figure 9E:
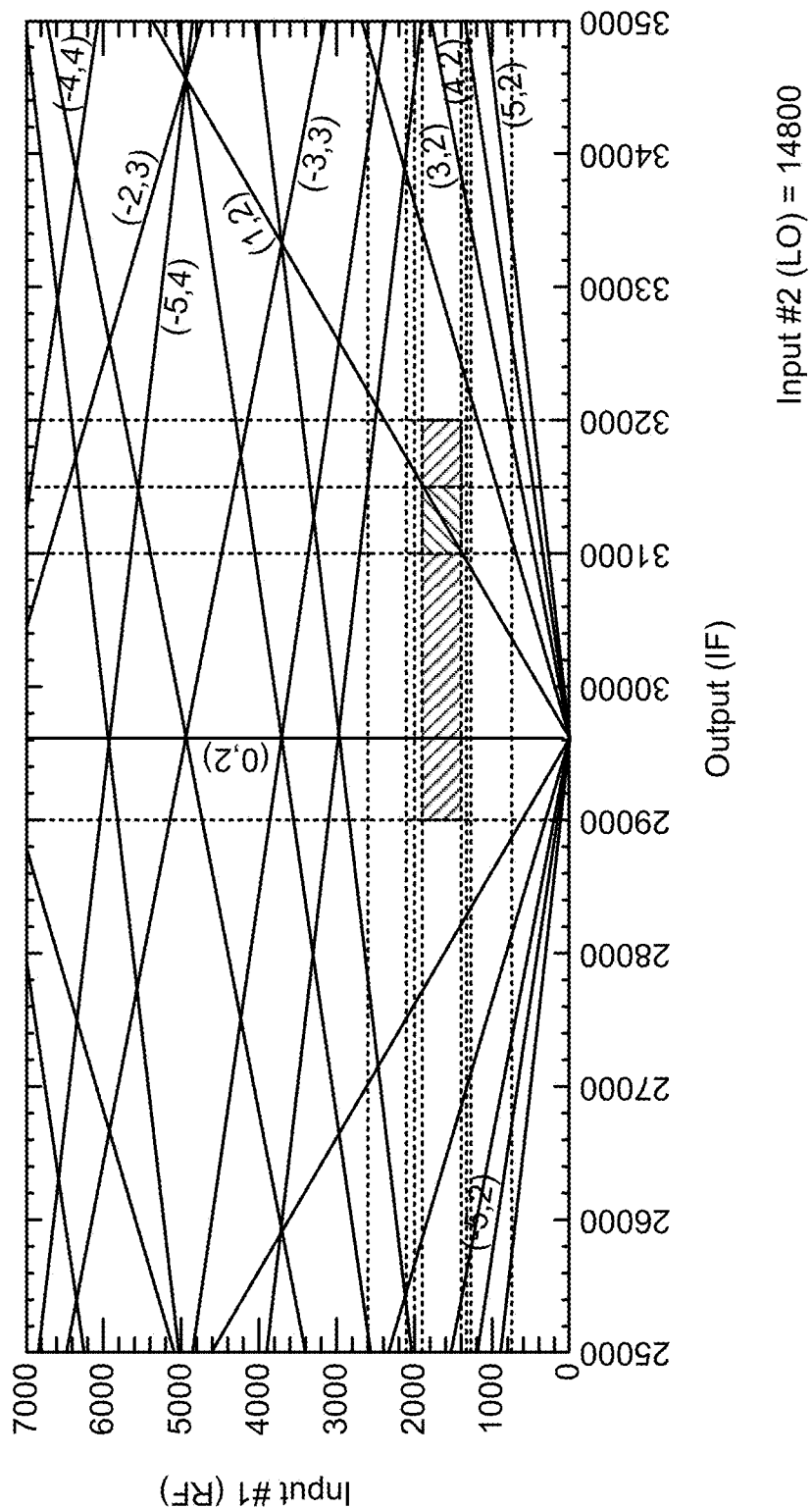
Figure 9F:
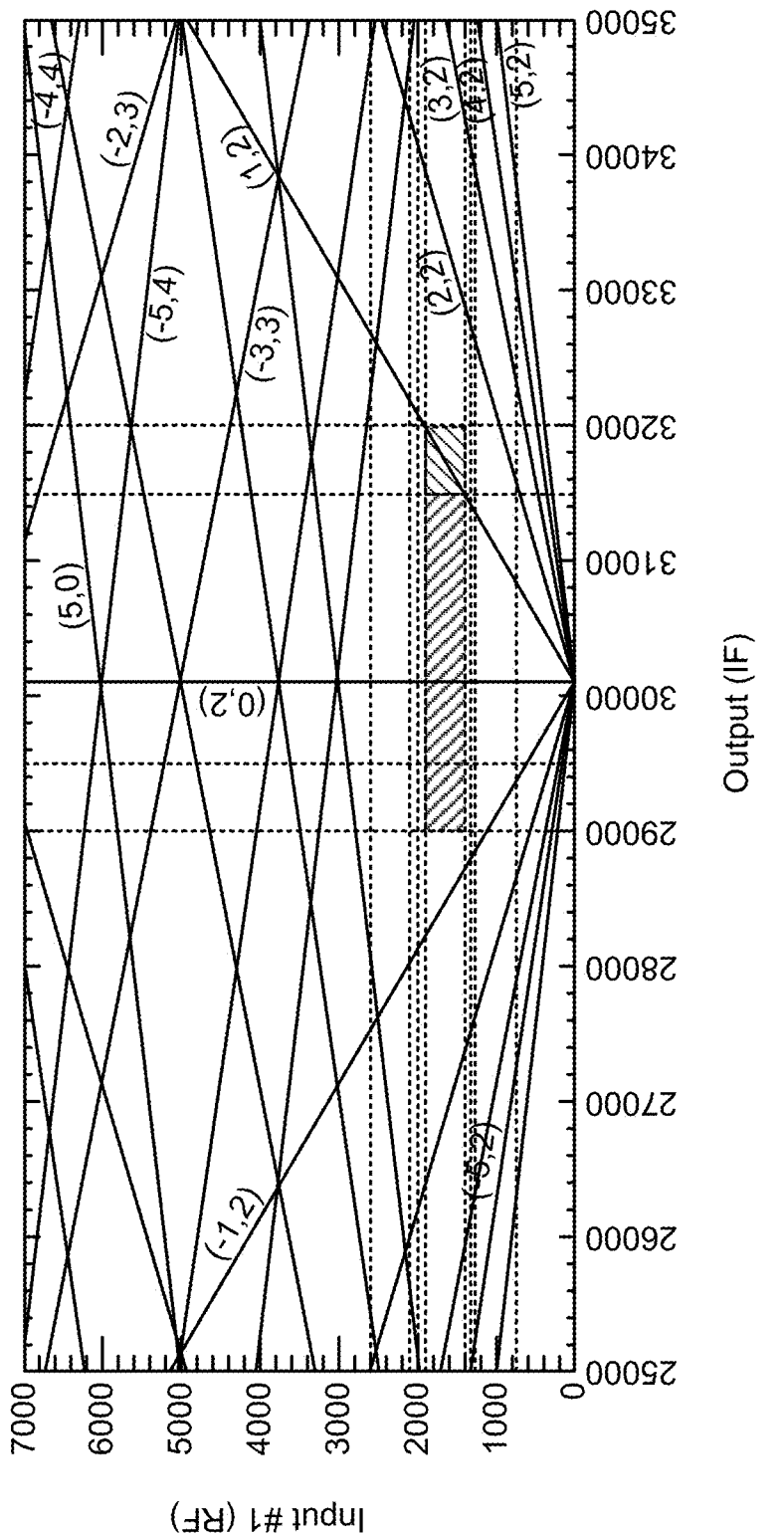

FIGS. 9A-9E illustrate the generation of spurs in the upconversion process, as performed by upconverters 320A-320F. FIG. 9A presents an plot of spur generation by downconverter 316A in the frequency plan illustrated in FIG. 5, while FIGS. 9B-9F present plots of spur generation by respective downconverters 320B-320F in the frequency plan illustrated in FIG. 5. Note again that in each case presented, the generated spurs avoid any fundamentals (0, n), and comprise mostly higher order spurs that can be readily filtered. The forward slashed boxes represent an analysis of the spurs potentially generated by each up converter 320, while the back-slashed boxes represent an analysis of the spurs potentially generated by the other upconverters 320 of the transceiver.

Figure 10:
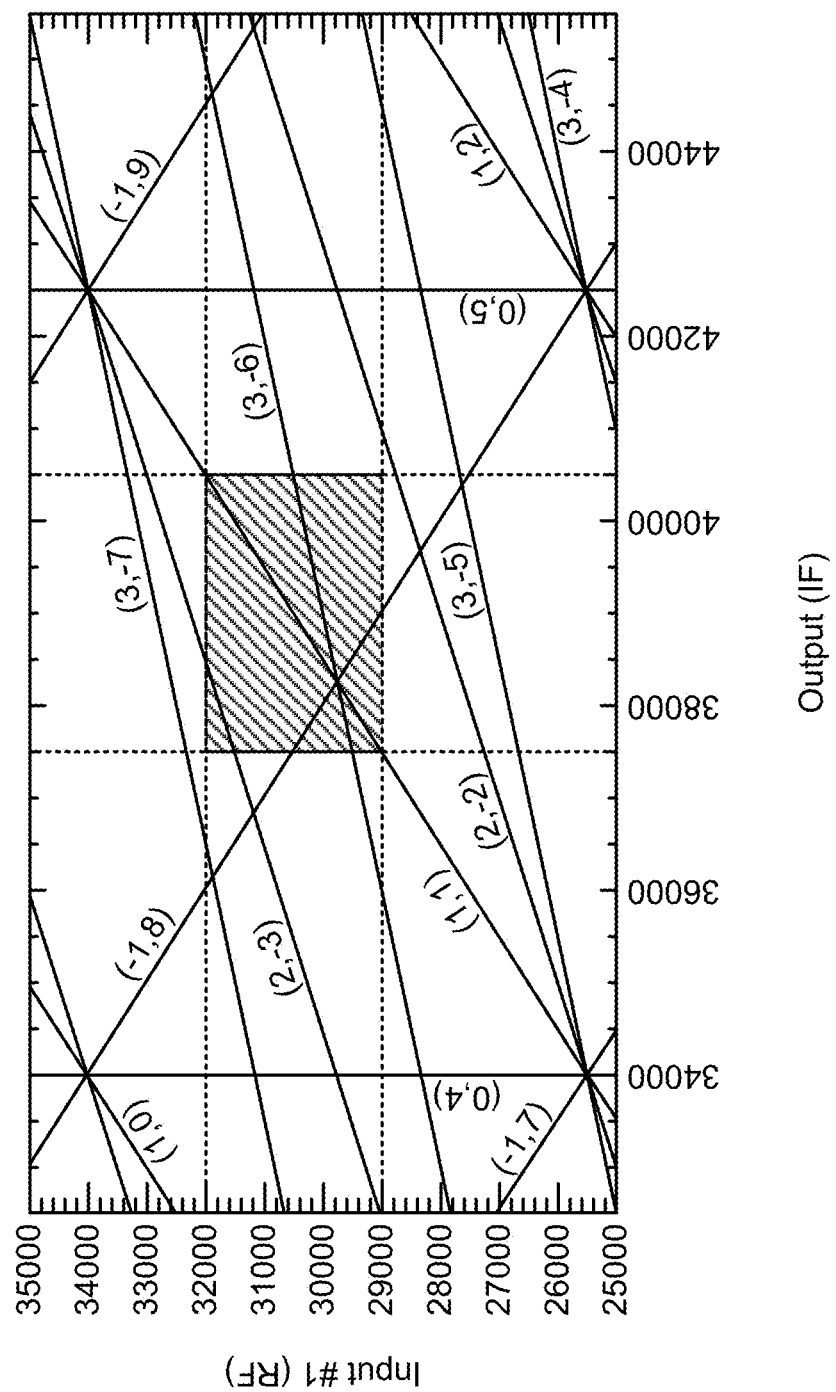
FIG. 10 illustrates the generation of spurs in the Ka-Q band upconversion process.

FIG. 10 illustrates the generation of spurs in the upconversion process, as performed by upconverter 328. Note again that in each case presented, the generated spurs avoid any fundamentals (0, n), and comprise mostly higher order spurs that can be readily filtered.

As can be seen from the plots presented in FIG. 7, FIGS. 8A-8F, FIGS. 9A-9F, and FIG. 10, although the downconverters 316A-316F and the upconverters 320A-320F each generate harmonics, judicious choice of the characteristics of the N sub-bands (e.g. in terms of center frequency and/or bandwidth) before downconversion and after downconversion can result in a system that substantially excludes spurs from key frequency bands. In this context, "substantial" exclusion of the spurs does not necessarily require that all spurs be excluded. Instead, this requires that the amplitude and/or phase of any remaining spurs be such that their appearance in frequency bands of interest does not negatively affect the performance of the transceiver 100 to a degree that the transceiver's functionality is unacceptably compromised for its intended use. When the spurs are far enough away from the band these spur can be then filtered by suitable means. The key spurs that are evaluated are the (0, n) spurs also known as LO harmonic spurs, the (1,n)

spurs, and spurs that have a spur order (also known as |m|+|n| value for a given (m,n) spur) less than or equal to 5.

Hardware Environment

Figure 11:
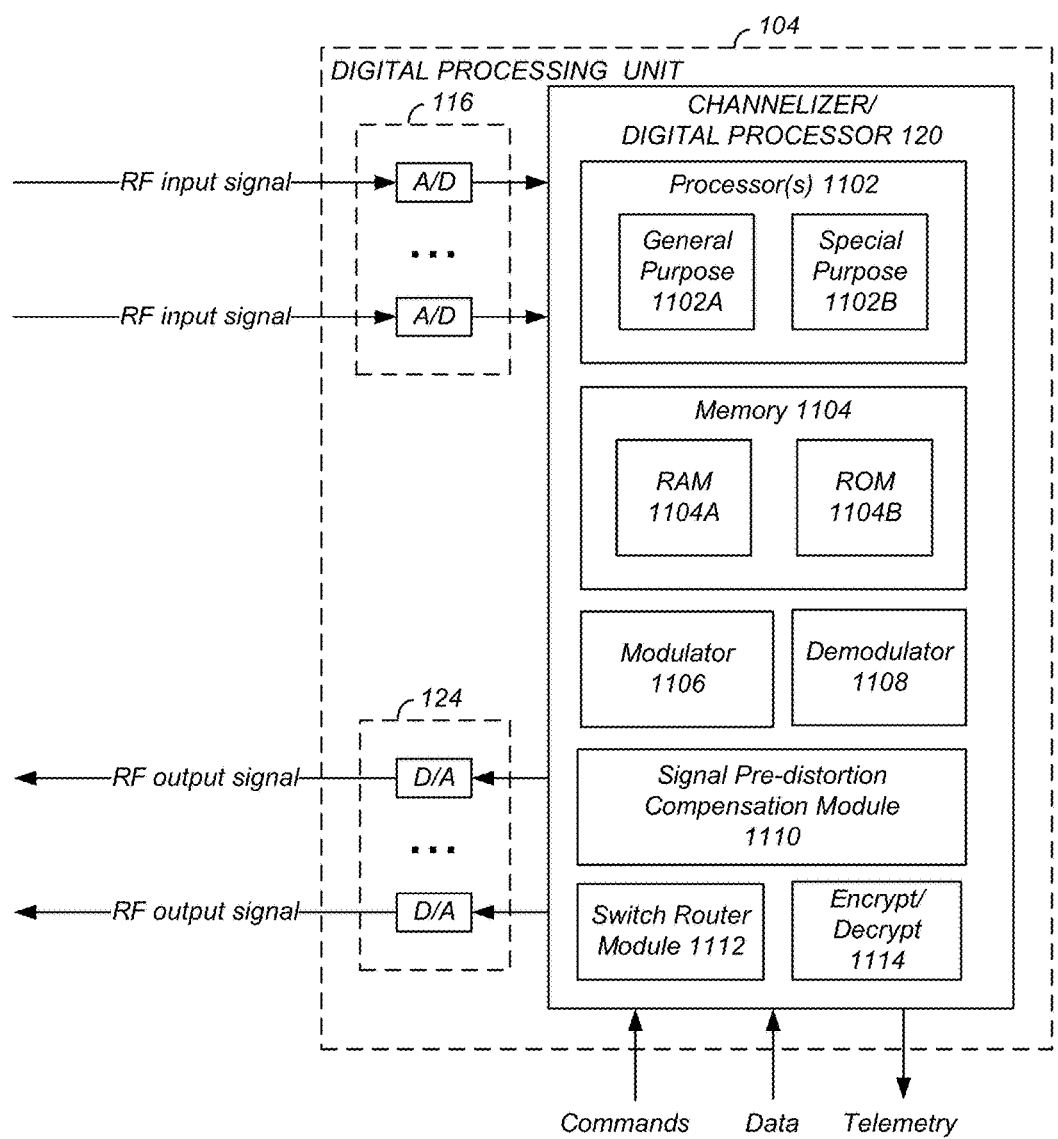
FIG. 11 illustrates an exemplary computer system that could be used to implement processing elements of the above disclosure.

FIG. 11 is a diagram illustrating an exemplary digital processing unit 104 having a channelizer/digital processor (hereinafter signal processor 120) that could be used to implement processing elements of the above disclosure.

The signal processor 120 comprises a processor 1102, communicatively coupled to a memory 1104 storing instructions for performing the operations discussed above. The processor 1102 may comprise a general purpose 1102A processor and/or a special purpose processor 1102B. For example, the special purpose processor 1102B may be implemented in one or more application specific integrated circuits (ASICs) or field programmable gate arrays (FPGAs), which may be implemented on the same or different structure as the other elements of the signal processor 120. The memory 1104 may include random access memory (RAM) 1104A and/or read only memory (ROM) 1104B, which for example, may include programmable read only memory (PROMs).

The signal processor 120 accepts input RF signals from A/Ds 116 and using the processor 1102 and instructions stored in memory 1104, generates output signals based on the input signals and provides the resulting output signals to D/As 124. In one embodiment, the output signals are also generated in accordance with configuration commands and/or externally provided data. The output signals and/or intermediate data generated in the process of generating the output signals may be provided via telemetry.

In the illustrated embodiment, the signal processor 120 may include a number of modules including a demodulator 1108, modulator 1106, pre-distortion compensation module 1110, switch router module 1112, and an encryption and/or decryption module 1114. The demodulator module 1108 demodulates the input signal from A/Ds 116 for further processing. The signal pre-distortion compensation module modifies the input signal according to an inverse model the gain and phase characteristics of the signal processor 120. This introduces "inverse distortion" into the process such that the resulting output signals are linearized. Switch router module 1112 routes input signals to other modules or processors and similarly routes output signals to the appropriate output. Encrypt/Decrypt module 1114 decrypts incoming signals and encrypts output signals as required. Any or all of module 1106-1114 may be implemented by use of processor 1102 instructions stored in the memory 1104, or may be implemented as separate hardware or firmware modules, using appropriate circuitry and/or ancillary processors and memory as appropriate.

Of course, those skilled in the art will recognize that any combination of the above components and functionalities, or any number of different components and functionalities may be integrated into the signal processor 120.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An apparatus configured to process a first signal in a first frequency band having a first bandwidth by a digital processor having a digital processor bandwidth in a second frequency band, comprising:
    a single receive unit configured to receive the first signal, the single receive unit comprising:
    a single converter, communicatively coupled to a low noise amplifier (LNA) within the single receive unit, the converter configured to convert the first signal of the first bandwidth into a first intermediate frequency band;
    a splitter, communicatively coupled to the single converter, the splitter configured to split the converted first signal into a N intermediate signals, each in a respective one of a first set of N sub-bands and each having a bandwidth less or equal than the digital processor bandwidth, wherein N is an integer greater than one;
    N downconverters, each of the N downconverters communicatively coupled to the splitter and each of the N downconverters configured to downconvert an associated one of the N intermediate signals to the second frequency band; and
    a digital processing unit, configured to process the downconverted plurality of signals with the digital processor to generate N processed signals,
    wherein each sub-band of the first set of N sub-bands is selected to substantially exclude lower order spurs generated by at least one of the N downconverters.

2. The apparatus of claim 1, wherein the apparatus further generates a second signal in a third frequency band and the apparatus to further comprise:
    N upconverters, each of the N upconverters communicatively coupled to the digital processing unit and each of the N upconverters configured to upconvert an associated one of the N processed signals to a respective one of a second set of N sub-bands of a second intermediate frequency band;
    a combiner, communicatively coupled to each of the N upconverters, configured to combine the upconverted N processed signals;
    an upconverter, communicatively coupled to the combiner, configured to convert the combined N upconverted signals from the second intermediate frequency band to the third frequency band and generate the second signal; and
    a transmit unit, configured to transmit the second signal;
    wherein each sub-band of the second set of N sub-bands is selected to substantially exclude lower order spurs generated by at least one of the N upconverters.

3. The apparatus of claim 2, wherein at least one of the sub-bands of the first set of N sub-bands is coextensive with a sub-band of the second set of N sub-bands.

4. The apparatus of claim 3, wherein:
    every one of the sub-bands of the first set of N sub-bands is coextensive with an associated one of the sub-band of the second set of N sub-bands.

5. The apparatus of claim 4, wherein the first set of N sub-bands are contiguous.

6. The apparatus of claim 3, wherein:
    the apparatus further comprises:
        N local oscillators, each one of the N local oscillators communicatively coupled to an associated one of the N downconverters to provide a local oscillator signal to the associated one of the N downconverters to downconvert the associated one of the N intermediate signals of the first set of N sub-bands to the second frequency band;

wherein at least one of the N local oscillators is further communicatively coupled to an associated one of the N upconverters to provide the local oscillator signal associated with the one of the N local oscillators to the associated one of the N upconverters to upconvert the associated one of the N processed signals to the respective one of the second set of N sub-bands of the second intermediate frequency band.

7. The apparatus of claim 6, wherein:
the first bandwidth is 3 GHz;
the digital processor bandwidth is 0.5 GHz;
N≥6; and
at least one of the first set of N sub-bands is disposed in a frequency band between 31.0 GHz and 32 GHz.

8. The apparatus of claim 6, wherein:
the first bandwidth is 3 GHz;
the digital processor bandwidth is 0.5 GHz;
N≥6; and
at least one of the first set of N sub-bands is disposed in a frequency band between 21.0 GHz and 22 GHz.

9. The apparatus of claim 2, wherein the first intermediate frequency band is selected to substantially exclude lower order spurs generated by converting the first signal of the first bandwidth into the first intermediate frequency band and converting the upconverted N processed signals to the third frequency band.

10. An apparatus configured to generate a first signal in a first frequency band having a first bandwidth from a plurality of second signals of a digital processor bandwidth, comprising:

a digital processing unit, configured to process the plurality of second signals with a digital processor to generate N processed signals, wherein N is an integer greater than one;

N upconverters, each of the N upconverters communicatively coupled to the digital processing unit and each of the N upconverters configured to upconvert an associated one of the N processed signals to a respective one of a first set of N sub-bands of a first intermediate frequency band;

a combiner, communicatively coupled to each of the N upconverters, the combiner configured to combine the upconverted N processed signals;

an upconverter, communicatively coupled to the combiner, the upconverter configured to convert the combined N upconverted signals from the first intermediate frequency band to the first frequency band to generate the first signal; and a transmit unit, configured to transmit the first signal;

wherein each of the respective first set of N sub-bands is selected to substantially exclude lower order spurs generated by at least one of the N upconverters.

11. The apparatus of claim 10, further comprising:
a single receive unit configured to receive a third signal of a third bandwidth greater than the digital processor bandwidth, the single receive unit comprising:

a single converter, communicatively coupled to a low noise amplifier within the single receive unit, the converter configured to convert the third signal into a second intermediate frequency band;

a splitter, communicatively coupled to the single converter, the splitter configured to split the converted third signal into N intermediate signals, each in a respective one of a second set of N sub-bands and each having a bandwidth less than the digital processor bandwidth;

N downconverters, each of the N downconverters communicatively coupled to the splitter and the digital processing unit, each of the N downconverters configured to downconvert an associated one of the N intermediate signals to produce a respective one of the plurality of second signals of a second frequency band;

wherein each of the second set of N sub-bands is selected to substantially exclude lower order spurs generated by at least one of the N downconverters.

12. The apparatus of claim 11, wherein at least one of the sub-bands of the first set of N sub-bands is coextensive with a sub-band of the second set of N sub-bands.

13. The apparatus of claim 12, wherein:
every one of the sub-bands of the first set of N sub-bands is coextensive with an associated one of the sub-band of the second set of N sub-bands.

14. The apparatus of claim 13, wherein the first set of N sub-bands are contiguous.

15. The apparatus of claim 12, wherein:
the apparatus further comprises:
N local oscillators, each one of the N local oscillators communicatively coupled to an associated one of the N downconverters to provide a local oscillator signal associated with one of the N local oscillators to the associated one of the N downconverters to downconvert the associated one of the N intermediate signals of the second set of N sub-bands to the second frequency band;

wherein at least one of the N local oscillators is further communicatively coupled to an associated one of the N upconverters to provide the local oscillator signal associated with the one of the N local oscillators to the associated one of the N upconverters to upconvert the associated one of the N processed signals to the respective one of the first set of N sub-bands of the first intermediate frequency band.

16. The apparatus of claim 15, wherein:
the first bandwidth is 3 GHz;
the digital processor bandwidth is 0.5 GHz;
N≥6; and
at least one of the respective first set of sub-bands is disposed in a frequency band between 31.0 GHz and 32 GHz.

17. The apparatus of claim 15, wherein:
the first bandwidth is 3 GHz;
the digital processor bandwidth is 0.5 GHz;
N≥6; and
at least one of the respective first set of sub-bands is disposed in a frequency band between 21.0 GHz and 22 GHz.

18. The apparatus of claim 11, wherein the first intermediate frequency band is further selected to substantially exclude lower order spurs generated by converting the first signal of the first bandwidth into the first intermediate frequency band and converting the upconverted N processed signals to the first frequency band.

19. A method for processing a first signal in a first frequency band having a first bandwidth by a digital processor having a digital processor bandwidth in a second frequency to generate a second signal comprising:
receiving the first signal;
converting the first signal into a first intermediate frequency band;
splitting the converted first signal into N intermediate signals, each in a respective one of a first set of N sub-bands and each having a bandwidth less than the digital processor bandwidth, wherein N is an integer greater than one;

downconverting each of the N intermediate signals to the second frequency band;

processing the downconverted plurality of signals with the digital processor to generate N processed signals; and generating the second signal from the processed downconverted plurality of signals, wherein each of the respective first set of N sub-bands is selected to substantially exclude lower order spurs generated by the downconversion of each of the N processed signals to the respective one of the N sub-bands of the second frequency band.

20. The method of claim 19, wherein the second signal is in a third frequency band and the method further comprises:

upconverting each of the N processed signals to a respective one of a second set of N sub-bands of a second intermediate frequency band;

converting the upconverted N processed signals to the third frequency band to generate the second signal; and transmitting the second signal, wherein each of the respective N sub-bands is further selected to substantially exclude lower order spurs generated by the downconversion of the N intermediate signals to a respective one of the second set of the N sub-bands of the second intermediate frequency band.

21. The method of claim 20, wherein at least one of the sub-bands of the first set of N sub-bands is coextensive with a sub-band of the second set of N sub-bands.

22. The method of claim 21, wherein:

every one of the sub-bands of the first set of N sub-bands is coextensive with an associated one of the sub-band of the second set of N sub-bands.

23. The method of claim 22, wherein the N sub-bands are contiguous.

24. The method of claim 21, wherein:

downconverting each of the N of intermediate signals to a respective one of N sub-bands of the second frequency band comprises:

downconverting each of the N of intermediate signals from its respective one of the first set of sub-bands to the second frequency band according to one of a plurality of local oscillator signals associated with the one of the first set of N sub-bands; and upconverting each of the N processed signals to the respective one of the second set of N sub-bands of the second intermediate frequency band comprises:

upconverting each of the N processed signals to the respective one of the second set of N sub-bands of the second intermediate frequency band according to the one of the plurality of local oscillator signals associated with the one of the first set of N sub-bands.

25. The method of claim 24, wherein:

downconverting each of the N of intermediate signals from its respective one of the first set of N sub-bands to the second frequency band according to one of a plurality of local oscillator signals associated with the one of the first set of N sub-bands comprises:

downconverting each of the N of intermediate signals from its respective one of the first set of N sub-bands of the second frequency band according to one of a plurality of local oscillator signals associated with the one of the first set of N sub-bands, the one of the plurality of local oscillator signals generated by a local oscillator associated with the one of the first set of N sub-bands;

upconverting each of the N processed signals to the respective one of the second set of N sub-bands of the second intermediate frequency band according to the one of the plurality of local oscillator signals associated with the one of the first set of N sub-bands comprises:

upconverting at least one of the N processed signals to the respective one of the second set of N sub-bands of the second intermediate frequency band according to the one of the plurality of local oscillator signals associated with the one of the first set of N sub-bands, the one of the plurality of local oscillator signals generated by the local oscillator associated with the one of the first set of N sub-bands.

26. The method of claim 25, wherein:

the first bandwidth is 3 GHz;

the digital processor bandwidth is 0.5 GHz;

N≥6; and at least one of the respective sub-bands is disposed in a frequency band between 31.0 GHz and 32 GHz.

27. The method of claim 25, wherein:

the first bandwidth is 3 GHz;

the digital processor bandwidth is 0.5 GHz;

N≥6; and at least one of the respective sub-bands is disposed in a frequency band between 21.0 GHz and 22 GHz.

28. The method of claim 19, wherein the first intermediate frequency band is selected to substantially exclude lower order spurs generated by converting the first signal of the first bandwidth into the first intermediate frequency band and converting the upconverted N processed signals to the second frequency band.

29. The method of claim 19, wherein:

converting the first signal of the first bandwidth into the first intermediate frequency band comprises block down converting the first signal of the first bandwidth to the intermediate frequency band.

* * * * *